United States Patent
Goto et al.

(10) Patent No.: US 10,634,970 B2
(45) Date of Patent: Apr. 28, 2020

(54) ELECTROCHROMIC ELEMENT

(71) Applicants: Daisuke Goto, Kanagawa (JP); Toshiya Sagisaka, Kanagawa (JP); Satoshi Yamamoto, Kanagawa (JP); Masato Shinoda, Kanagawa (JP); Mamiko Inoue, Kanagawa (JP); Tohru Yashiro, Kanagawa (JP)

(72) Inventors: Daisuke Goto, Kanagawa (JP); Toshiya Sagisaka, Kanagawa (JP); Satoshi Yamamoto, Kanagawa (JP); Masato Shinoda, Kanagawa (JP); Mamiko Inoue, Kanagawa (JP); Tohru Yashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 15/779,398

(22) PCT Filed: Oct. 19, 2016

(86) PCT No.: PCT/JP2016/004636
§ 371 (c)(1),
(2) Date: May 25, 2018

(87) PCT Pub. No.: WO2017/094218
PCT Pub. Date: Jun. 8, 2017

(65) Prior Publication Data
US 2018/0314125 A1    Nov. 1, 2018

(30) Foreign Application Priority Data

Nov. 30, 2015 (JP) .................................. 2015-233591
May 12, 2016 (JP) .................................. 2016-096204

(51) Int. Cl.
*G02F 1/15*     (2019.01)
*G02F 1/153*    (2006.01)
(Continued)

(52) U.S. Cl.
CPC ............. *G02F 1/155* (2013.01); *C09K 9/02* (2013.01); *G02F 1/13439* (2013.01); *G02F 1/15* (2013.01);
(Continued)

(58) Field of Classification Search
CPC ........ G02F 1/15; G02F 1/15165; G02F 1/155; G02F 1/13439; G02F 1/0102;
(Continued)

(56) References Cited

U.S. PATENT DOCUMENTS 6,203,154 B1    3/2001 Kobayashi et al.
6,208,452 B1    3/2001 Nishikitani et al.
(Continued)

FOREIGN PATENT DOCUMENTS

EP    0 995 786 A1    4/2000
EP    3 268 448        1/2018
(Continued)

OTHER PUBLICATIONS

Extended European Search Report dated May 6, 2019 in European Patent Application No. 16870161.3, 9 pages.
(Continued)

*Primary Examiner* — Brandi N Thomas
(74) *Attorney, Agent, or Firm* — Oblon, McClelland, Maier & Neustadt, L.L.P.

(57) ABSTRACT

An electrochromic element including: a first electrode; a second electrode that is opposed to and apart from the first electrode; and an electrolyte that is between the first electrode and the second electrode, wherein the first electrode includes a polymerized product of an electrochromic composition that includes a radical-polymerizable compound including a triarylamine backbone, and wherein the second electrode includes a compound represented by General Formula (I) where $R_1$ and $R_2$ each denote a hydrogen atom,
(Continued)

an aryl group including 14 or less carbon atoms, a heteroaryl group including 14 or less carbon atoms, a branched alkyl group including 10 or less carbon atoms, an alkenyl group including 10 or less carbon atoms, a cycloalkyl group including 10 or less carbon atoms, or a functional group that is capable of binding to a hydroxyl group; n and m each denote 0 or an integer of from 1 through 10; and $X^-$ denotes a charge-neutralizing ion.

11 Claims, 1 Drawing Sheet

(51) Int. Cl.
    *G02F 1/155* (2006.01)
    *G02F 1/1516* (2019.01)
    *C09K 9/02* (2006.01)
    *G02F 1/1343* (2006.01)

(52) U.S. Cl.
    CPC .. *G02F 1/15165* (2019.01); *C09K 2211/1425* (2013.01); *C09K 2211/1433* (2013.01)

(58) Field of Classification Search
    CPC ...... G02F 1/0121; G02F 1/061; G02F 1/1506; G02F 1/1525; G02F 1/157; G02F 1/163; G02F 1/153; G02F 2202/022; C08G 2261/3223; C08G 61/126; C08G 2261/1424; C08G 2261/143; C08G 2261/412; C08G 2261/794; C08G 75/06; C08G 2261/12; C08G 2261/18; C08G 2261/3225; C08G 2261/3241; C08G 2261/344; C08G 2261/91; C08G 61/124
    USPC ........ 359/237, 242, 244, 265–273, 290–292, 359/295, 298
    See application file for complete search history.

(56) References Cited

U.S. PATENT DOCUMENTS

| | | |
|---|---|---|
| 2010/0091353 A1 | 4/2010 | Kokeguchi et al. |
| 2013/0335800 A1 | 12/2013 | Konkin et al. |
| 2015/0331295 A1 | 11/2015 | Takahashi et al. |
| 2016/0005375 A1 | 1/2016 | Naijo et al. |
| 2016/0108072 A1 | 4/2016 | Inoue et al. |
| 2017/0329199 A1* | 11/2017 | Yashiro ................. G02F 1/1533 |
| 2018/0044581 A1 | 2/2018 | Sagisaka et al. |
| 2019/0324338 A1* | 10/2019 | Takauji ................. G02F 1/1503 |

FOREIGN PATENT DOCUMENTS

| | | |
|---|---|---|
| JP | 11-183938 | 7/1999 |
| JP | 2011-180454 | 9/2011 |
| JP | 2016-038572 | 3/2016 |
| JP | 2016-045464 | 4/2016 |
| JP | 2017-107153 | 6/2017 |
| WO | WO 2016/021129 A1 | 2/2016 |
| WO | WO 2016/147543 A1 | 9/2016 |

OTHER PUBLICATIONS

Australian Office Action dated May 14, 2019 in Australian Patent Application No. 2016363036, 4 pages.
International Search Report dated Dec. 20, 2016 for counterpart International Patent Application No. PCT/JP2016/004636 filed Oct. 19, 2016.
Written Opinion dated Dec. 20, 2016 for counterpart International Patent Application No. PCT/JP2016/004636 filed Oct. 19, 2016.
M. Li, et al., "Highly contrasted and stable electrochromic device based on well-matched viologen and triphenylamine," Organic Electronics, vol. 15, Issue 2, Nov. 30, 2013, pp. 1-7.
U.S. Appl. No. 15/190,681, filed Jun. 23, 2016, Tohru Yashiro, et al.

* cited by examiner

[Fig. 1]
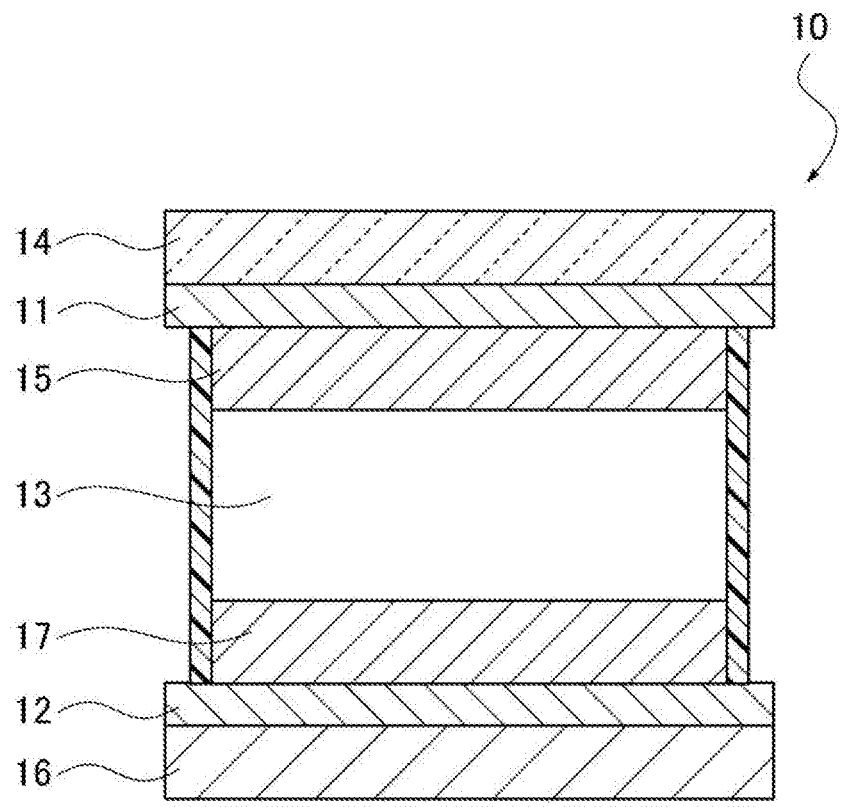

ELECTROCHROMIC ELEMENT

TECHNICAL FIELD

The present invention relates to an electrochromic element.

BACKGROUND ART

Electrochromism is a phenomenon where a material reversibly undergoes an oxidation-reduction reaction as a result of application of voltage and thus is reversibly changed in color. An electrochromic material exhibiting the electrochromism typically undergoes an oxidation-reduction reaction in a configuration where the electrochromic material is formed between two opposing electrodes and an ion-conductive electrolyte layer is filled between the electrodes. When a reduction reaction occurs adjacent to one of the two opposing electrodes, an oxidation reaction, which is a reverse reaction of the reduction reaction, occurs adjacent to the second electrode. That is, in a device using the electrochromic material, when voltage is applied, the electrochromic material is colored at both of the electrodes and is changed a hue or optical density.

There has been disclosed an electrochromic element including the electrochromic material (see, for example, PTL 1). When a transparent display device is produced using the electrochromic material, or when a device having a configuration, in which three coloring layers of cyan (C), magenta (M), and yellow (Y) are laminated, is produced for a full-color display, it is necessary that the electrochromic element is formed of a material that is colorless and transparent in a discolored state.

As the electrochromic material, there have been utilized viologen compounds exhibiting an electrochromic phenomenon where the compounds are colorless and transparent in a neutral state but are colored in a reduced state. When the viologen compounds are used, titanium oxide is suitably used. It has been reported that use of titanium oxide particles as electrochromic-compound bearing particles in a laminate is capable of achieving high optical density and a high contrast ratio.

There have been reported triarylamine compounds as an electrochromic material that is transparent in a neutral state but are colored in an oxidized state (see, for example, NPL 1). There has also proposed a combination of reactive, oppositely-polarized compound materials including a triarylamine polymer and a viologen compound (see, for example, PTL 2). However, the combination is unsatisfactory. This is because optical density and stability to repetitive use have been mentioned in the document, but coloring after repetitive use has not been studied.

Therefore, there has not been provided an electrochromic element that is operable at a relatively low drive voltage and is excellent in durability to repetitive use and responsivity.

CITATION LIST

Patent Literature

PTL 1: Japanese Unexamined Patent Application Publication No. 11-183938
PTL 2: Japanese Unexamined Patent Application Publication No. 2016-45464

Non Patent Literature

NPL 1: Org. Electron. 2014, 15, 428-434.

SUMMARY OF INVENTION

Technical Problem

The present invention has an object to provide an electrochromic element that is operable at a relatively low drive voltage and is excellent in durability to repetitive use and responsivity.

Solution to Problem

An electrochromic element of the present invention as a means for solving the aforementioned problems includes a first electrode, a second electrode, and an electrolyte. The second electrode is opposed to and apart from the first electrode. The electrolyte is between the first electrode and the second electrode.

The first electrode includes a polymerized product of an electrochromic composition that includes a radical-polymerizable compound including a triarylamine backbone.

The second electrode includes a compound represented by General Formula (I) below.

<General Formula (I)>

[Chem. 1]

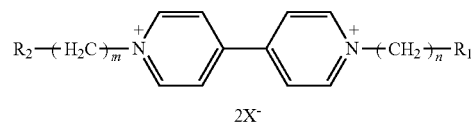

$2X^-$

In the General Formula (I), $R_1$ and $R_2$ each denote a hydrogen atom, an aryl group including 14 or less carbon atoms, a heteroaryl group including 14 or less carbon atoms, a branched alkyl group including 10 or less carbon atoms, an alkenyl group including 10 or less carbon atoms, a cycloalkyl group including 10 or less carbon atoms, or a functional group that is capable of binding to a hydroxyl group; n and m each denote 0 or an integer of from 1 through 10; and $X^-$ denotes a charge-neutralizing ion.

Advantageous Effects of Invention

The present invention is capable of providing an electrochromic element that is operable at a relatively low drive voltage and is excellent in durability to repetitive use and responsivity.

BRIEF DESCRIPTION OF DRAWINGS

FIG. 1 is a cross-sectional view schematically illustrating one exemplary configuration of an electrochromic element according to the first embodiment of the present invention.

DESCRIPTION OF EMBODIMENTS (Electrochromic Element According to First Embodiment)

An electrochromic element according to the first embodiment of the present invention will now be described. The electrochromic element according to the present embodiment includes a first electrode, a second electrode, and an electrolyte between the first electrode and the second electrode; and, if necessary, further includes other members.

The present inventors conducted extensive studies to solve the aforementioned problems, and have paid attention to a heat- or photo-curable triarylamine compound that is practically used for a photoconductor of an electrophotographic copier. The photoconductor including the heat- or photo-curable triarylamine compound is an important member involved in processes other than fixing among image formation processes of the copier (e.g., charging, exposure, developing, transfer, separation, or fixing). During the image formation processes of the copier, the photoconductor is always exposed to the air including moisture and oxygen. In addition, the photoconductor is designed to be exposed to strong light during exposure and charge-elimination processes, and subjected to electrostatic charging and charge-elimination repeatedly at high speed.

The present inventors have focused on light resistance and resistance to repetitive, electrostatic charging and charge-elimination, which is a similar process to an oxi-dization-reduction process, of the heat- or photo-curable triarylamine compound, and have attempted to apply the heat- or photo-curable triarylamine compound to an electrochromic element. That is, the present inventors have found that electrochromic elements having more excellent effects, in particular, more excellent resistance to repetitive use and more excellent light resistance than conventional electrochromic elements are capable of being achieved by selecting a backbone of a heat- or photo-curable triarylamine compound that is capable of satisfying physical properties (e.g., transparency in a neutral state, solubility, and laminatability) required for application to the electrochromic element, and applying the thus-selected triarylamine compound to the electrochromic element under optimal conditions and at an optimal position.

In the present embodiment, the first electrode includes a polymerized product of an electrochromic composition that includes a radical-polymerizable compound including a triarylamine backbone. The first electrode preferably includes a cross-linked product of an electrochromic composition that includes a radical-polymerizable compound including a triarylamine backbone and another radical-polymerizable compound different from the radical-polymerizable compound including a triarylamine backbone, from the viewpoints of solubility and durability of the polymerized product.

<First Electrochromic Layer>

The phrase "the first electrode includes a polymerized product of an electrochromic composition that includes a radical-polymerizable compound including a triarylamine backbone" includes an aspect where a first electrochromic layer formed of a polymerized product of a first electrochromic composition that includes a radical-polymerizable compound including a triarylamine backbone is laminated onto the first electrode; an aspect where two or more layers of the first electrochromic layers are laminated onto the first electrode; and an aspect where the first electrochromic layer is laminated onto a part of the first electrode.

The phrase "the first electrode includes a cross-linked product of an electrochromic composition that includes a radical-polymerizable compound including a triarylamine backbone and another radical-polymerizable compound different from the radical-polymerizable compound including a triarylamine backbone" includes a first electrochromic layer formed of a cross-linked product of a first electrochromic composition that includes a radical-polymerizable compound including a triarylamine backbone and another radical-polymerizable compound different from the radical-polymerizable compound including a triarylamine backbone is laminated onto the first electrode; an aspect where two or more layers of the first electrochromic layers are laminated onto the first electrode; and an aspect where the first electrochromic layer is laminated onto a part of the first electrode.

<First Electrochromic Composition>

The first electrochromic composition includes a radical-polymerizable compound including a triarylamine backbone, preferably includes a filler and another radical-polymerizable compound different from the radical-polymerizable compound including a triarylamine backbone, more preferably includes a polymerization initiator; and, if necessary, further includes other components.

«Radical-Polymerizable Compound Including a Triarylamine Backbone»

The radical-polymerizable compound including a triarylamine backbone is important for the purpose of imparting an electrochromic function causing an oxidation-reduction reaction at a surface of the first electrode. Examples of the radical-polymerizable compound including a triarylamine backbone include compounds represented by General Formula 1 below:

$$An-Bm \qquad \text{<General Formula 1>}$$

where m is 0 when n=2, and m is 0 or 1 when n=1; at least one of A and B is a radical-polymerizable functional group; the A has a structure represented by General Formula 2 below and is bound to the B at any position of $R_1$ to $R_{15}$; the B has a structure represented by General Formula 3 below and is bound to the A at any position of $R_{16}$ to $R_{21}$.

<General Formula 2>

[Chem. 2]

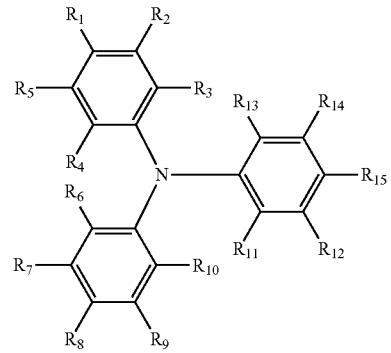

<General Formula 3>

[Chem. 3]

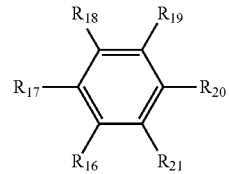

In the General Formulae 2 and 3, $R_1$ to $R_{21}$, which may be identical to or different from each other, are all monovalent organic groups, and at least one of the monovalent organic groups is a radical-polymerizable functional group.

—Monovalent Organic Group—

The monovalent organic groups in the General Formulae 2 and 3 may be each independently a hydrogen atom, a halogen atom, a hydroxyl group, a nitro group, a cyano group, a carboxyl group, an optionally substituted alkoxycarbonyl group, an optionally substituted aryloxycarbonyl group, an optionally substituted alkylcarbonyl group, an optionally substituted arylcarbonyl group, an amide group, an optionally substituted monoalkylaminocarbonyl group, an optionally substituted dialkylaminocarbonyl group, an optionally substituted monoarylaminocarbonyl group, an optionally substituted diarylaminocarbonyl group, a sulfonate group, optionally substituted alkoxy-sulfonyl group, an optionally substituted aryloxysulfonyl group, an optionally substituted alkylsulfonyl group, an optionally substituted arylsulfonyl group, a sul-fonamide group, an optionally substituted monoalkylaminosulfonyl group, an optionally substituted dialkylaminosulfonyl group, an optionally substituted monoary-laminosulfonyl group, an optionally substituted diarylaminosulfonyl group, an amino group, an optionally substituted monoalkylamino group, an optionally substituted di-alkylamino group, an optionally substituted alkyl group, an optionally substituted alkenyl group, an optionally substituted alkynyl group, an optionally substituted aryl group, an optionally substituted alkoxy group, an optionally substituted aryloxy group, an optionally substituted alkylthio group, an optionally substituted arylthio group, and an optionally substituted heterocyclic group. Among them, an alkyl group, an alkoxy group, a hydrogen atom, an aryl group, an aryloxy group, a halogen atom, an alkenyl group, or an alkynyl groups is particularly preferable from the viewpoint of stable operation.

Examples of the halogen atom include a fluorine atom, a chlorine atom, a bromine atom, and an iodide atom. Examples of the alkyl group include a methyl group, an ethyl group, a propyl group, and a butyl group. Examples of the aryl group include a phenyl group and a naphthyl group. Examples of the aralkyl group include a benzyl group, a phenethyl group, and a naphthylmethyl group. Examples of the alkoxy group include a methoxy group, an ethoxy group, and a propoxy group. Examples of the aryloxy group include a phenoxy group, a 1-naphthyloxy group, a 2-naphthyloxy group, a 4-methoxyphenoxy group, and a 4-methylphenoxy group. Examples of the heterocyclic group include carbazole, dibenzofuran, dibenzothiophene, oxadiazole, and thiadiazole.

Examples of substituents further substituted with the above-described substituents include a halogen atom, a nitro group, a cyano group, alkyl groups such as a methyl group and an ethyl group, alkoxy groups such as a methoxy group and an ethoxy group, aryloxy groups such as a phenoxy group, aryl groups such as a phenyl group and naphthyl group, and aralkyl groups such as a benzyl group and a phenethyl group.

—Radical-polymerizable Functional Group—

The radical-polymerizable functional group may be any group so long as the group includes a carbon-carbon double bond and is a radical-polymerizable group. Examples of the radical-polymerizable functional group include 1-substituted ethylene functional groups and 1,1-substituted ethylene functional groups illustrated below.

(1) Examples of the 1-substituted ethylene functional groups include functional groups represented by General Formula (i) below.
[Chem.4]

   General Formula (i)

In the General Formula (i), $X_1$ denotes an optionally substituted arylene group, an optionally substituted alkenylene group, a —CO— group, a —COO— group, a —CON($R_{100}$)— group (where $R_{100}$ denotes hydrogen, an alkyl group, an aralkyl group, or an aryl group), or a —S— group.

Examples of the arylene group in the General Formula (i) include an optionally substituted phenylene group and a naphthylene group. Examples of the alkenylene group include an ethenylene group, a propenylene group, and a butenylene group. Examples of the alkyl group include a methyl group and an ethyl group. Examples of the aralkyl group include a benzyl group, a naphthylmethyl group, and a phenethyl group. Examples of the aryl group include a phenyl group and a naphthyl group.

Specific examples of the radical-polymerizable functional group represented by the General Formula (i) include a vinyl group, a styryl group, a 2-methyl-1,3-butadienyl group, a vinylcarbonyl group, an acryloyl group, an acryloyloxy group, an acry-loylamide group, and a vinylthioether group.

(2) Examples of the 1,1-substituted ethylene functional groups include functional groups represented by General Formula (ii) below.
[Chem.5]

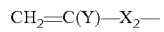   General Formula (ii)

In the General Formula (ii), Y denotes an optionally substituted alkyl group, an optionally substituted aralkyl group, an optionally substituted aryl group, a halogen atom, a cyano group, a nitro group, an alkoxy group, or a —COOR$_{101}$ group [where $R_{101}$ denotes a hydrogen atom, an optionally substituted alkyl group, an optionally substituted aralkyl group, an optionally substituted aryl group, or CONR$_{102}$R$_{103}$ (where $R_{102}$ and $R_{103}$, which may be identical to or different from each other, denote a hydrogen atom, an optionally substituted alkyl group, am optionally substituted aralkyl group, or an optionally substituted aryl group)]; and $X_2$ denotes the same substituent as described for $X_1$ in the General Formula (i), a single bond, or an alkylene group, provided that at least one of Y and $X_2$ is an oxycarbonyl group, a cyano group, an alkenylene group, or an aromatic ring.

Examples of the aryl group in the General Formula (ii) include a phenyl group and a naphthyl group. Examples of the alkyl group include a methyl group and an ethyl group. Examples of the alkoxy group include a methoxy group and an ethoxy group. Examples of the aralkyl group include a benzyl group, a naphthylmethyl group, and a phenethyl group.

Specific examples of the radical-polymerizable functional group represented by the General Formula (ii) include an alpha-acryloyloxy chloride group, a methacryloyl group, a methacryloyloxy group, an alpha-cyanoethylene group, an alpha-cyanoacryloyloxy group, an alpha-cyanophenylene group, and a methacryloylamino group.

Note that, examples of substituents further substituted with the substituents described for $X_1$, $X_2$, or Y include a halogen atom, a nitro group, a cyano group, alkyl groups such as a methyl group and an ethyl group, alkoxy groups such as a methoxy group and an ethoxy group, aryloxy groups such as a phenoxy group, aryl groups such as a phenyl group and naphthyl group, and aralkyl groups such as a benzyl group and a phenethyl group.

Among the radical-polymerizable functional groups, an acryloyloxy group and a methacryloyloxy group are particularly preferable.

Suitable examples of the radical-polymerizable compound including a triarylamine backbone include compounds represented by General Formulae (1-1) to (1-3) below.

<General Formula (1-1)>

[Chem. 6]

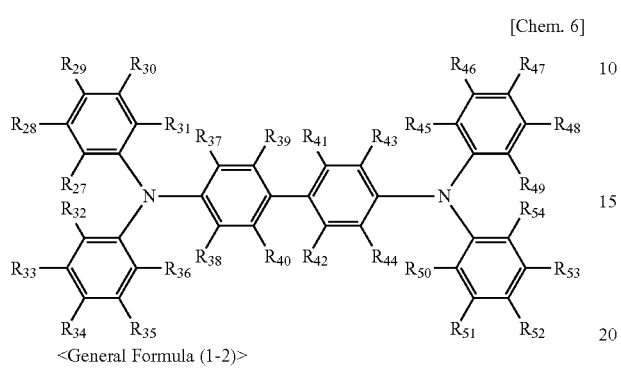

<General Formula (1-2)>

[Chem. 7]

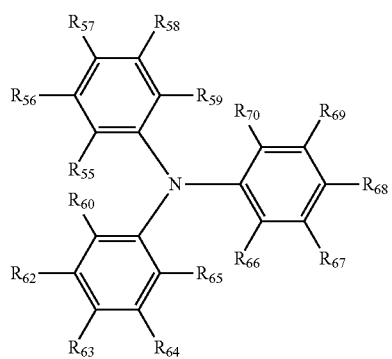

<General Formula (1-3)>

[Chem. 8]

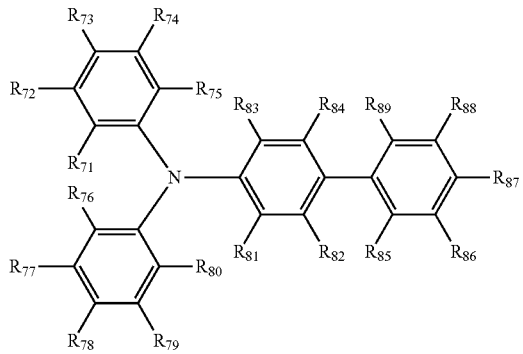

In the General Formulae (1-1) to (1-3), $R_{27}$ to $R_{89}$, which may be identical to or different from each other, denote all monovalent organic groups, provided that at least one of the monovalent organic groups is a radical-polymerizable functional group. The monovalent organic group and the radical-polymerizable functional group may be the same as described for the General Formulae 2 and 3.

Examples of exemplary compounds represented by the General Formula 1 and the General Formulae (1-1) to (1-3) include Exemplary compounds illustrated below. The radical-polymerizable compound including a triarylamine backbone is not limited thereto.

<Exemplary compound 1>

[Chem. 9]

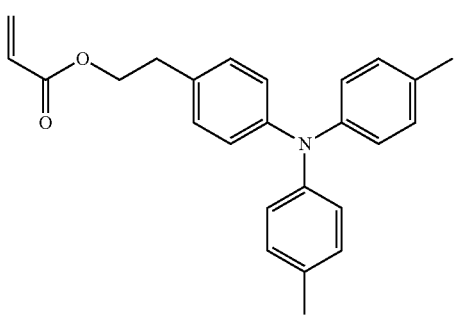

<Exemplary compound 2>

[Chem. 10]

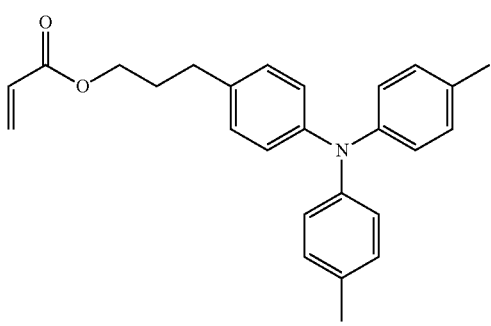

-continued
<Exemplary compound 3>
[Chem. 11]
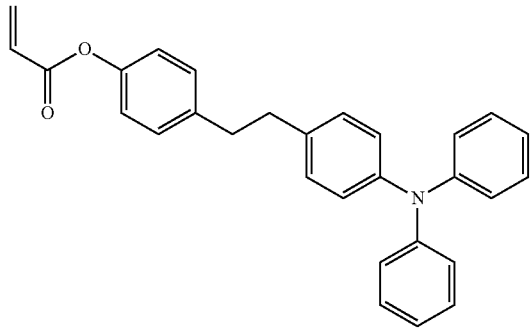
<Exemplary compound 4>
[Chem. 12]
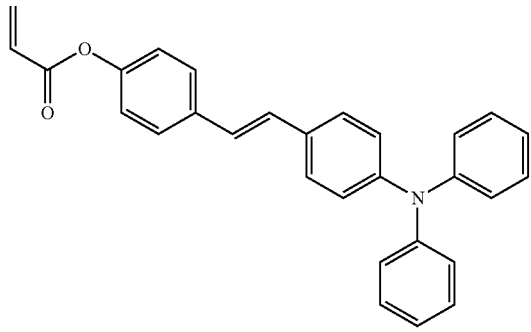
<Exemplary compound 5>
[Chem. 13]
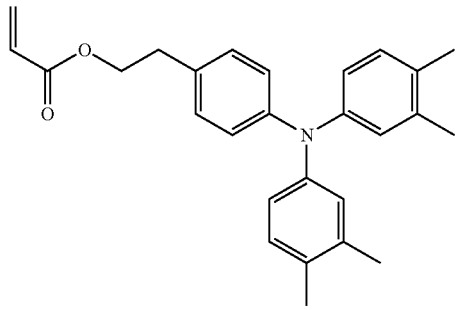
<Exemplary compound 6>
[Chem. 14]
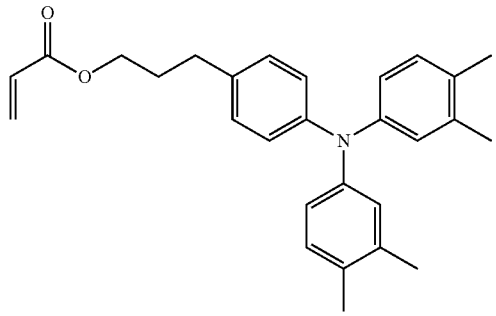

<Exemplary compound 7>
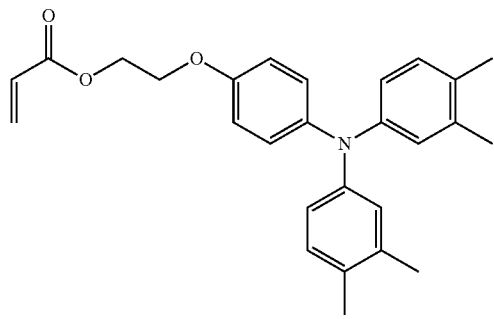
[Chem. 15]
<Exemplary compound 8>
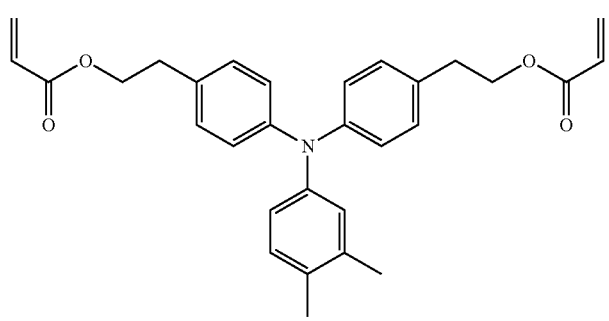
[Chem. 16]
<Exemplary compound 9>
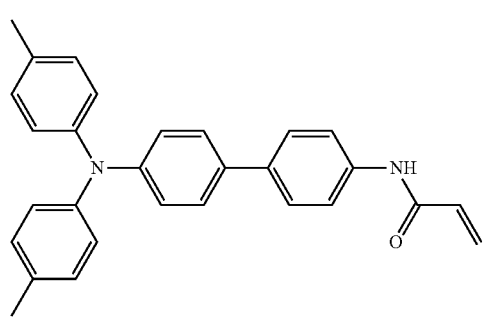
[Chem. 17]
<Exemplary compound 10>
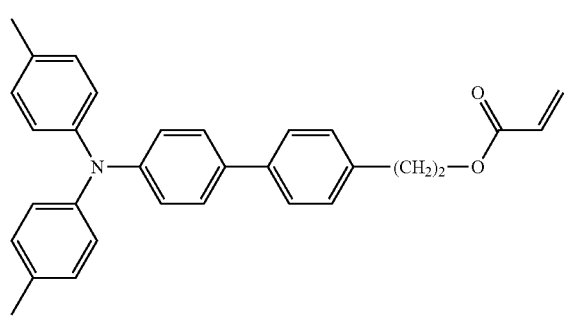
[Chem. 18]

<Exemplary compound 11>
[Chem. 19]
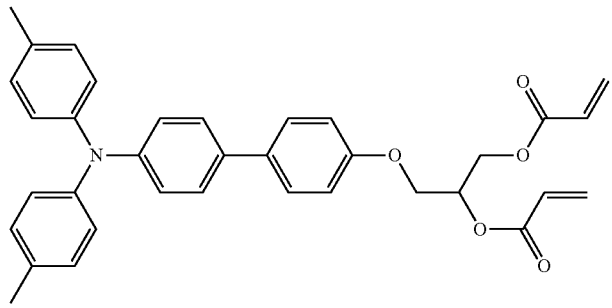
<Exemplary compound 12>
[Chem. 20]
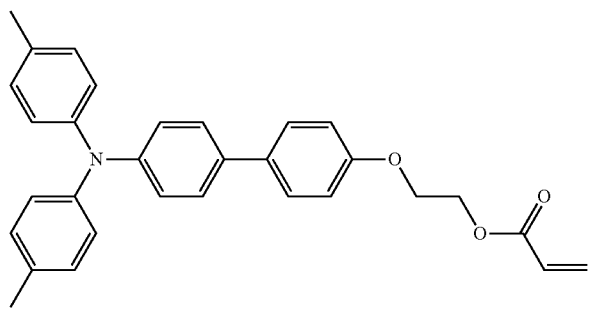
<Exemplary compound 13>
[Chem. 21]
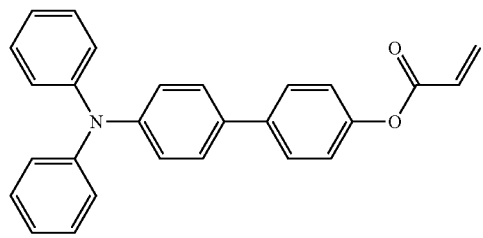
<Exemplary compound 14>
[Chem. 22]
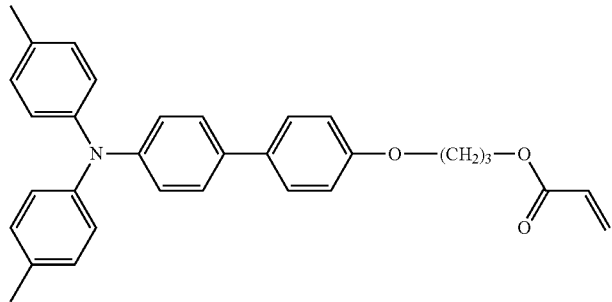

-continued
<Exemplary compound 15>
[Chem. 23]
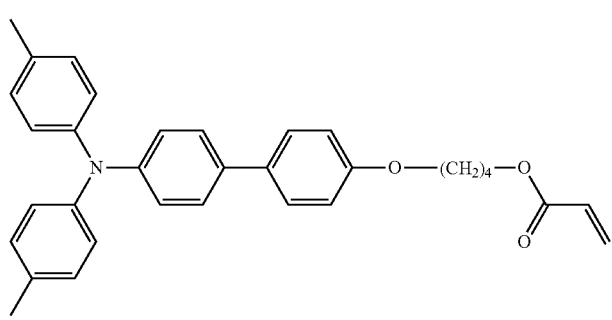
<Exemplary compound 16>
[Chem. 24]
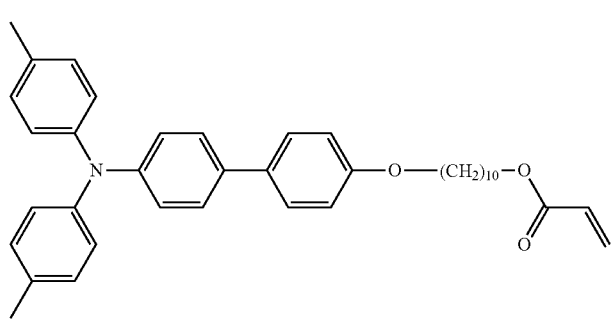
<Exemplary compound 17>
[Chem. 25]
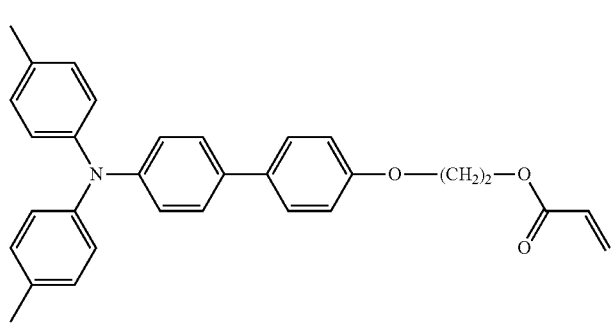
<Exemplary compound 18>
[Chem. 26]
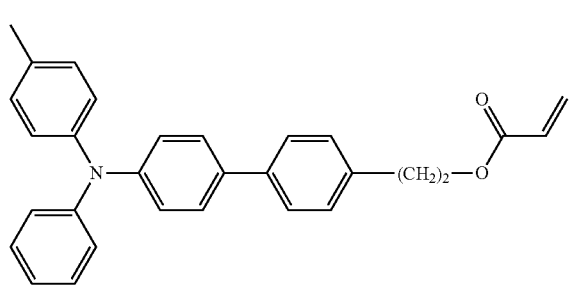

<Exemplary compound 19>
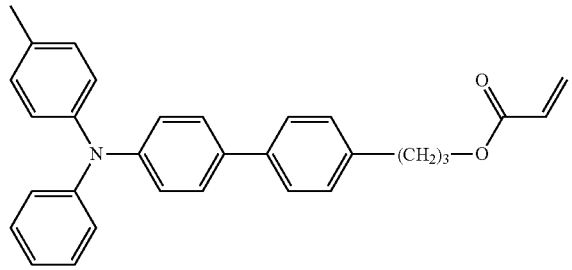
[Chem. 27]
<Exemplary compound 20>
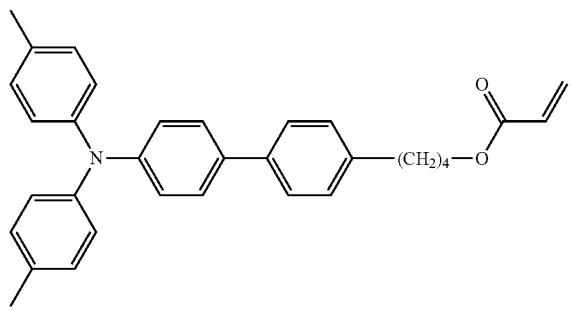
[Chem. 28]
<Exemplary compound 21>
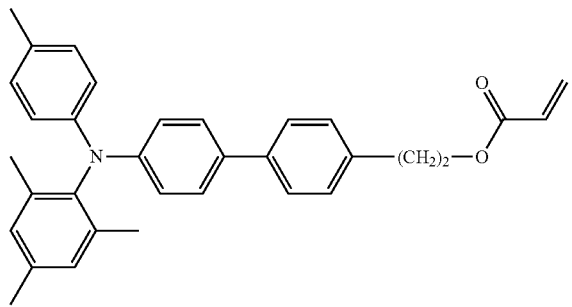
[Chem. 29]
<Exemplary compound 22>
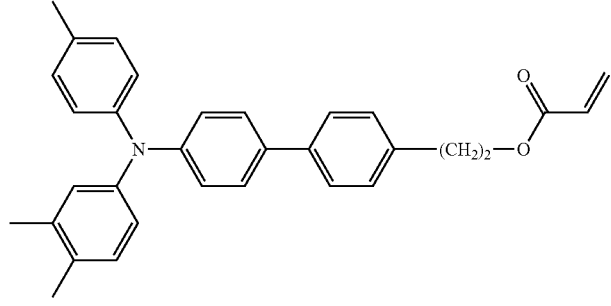
[Chem. 30]

-continued
<Exemplary compound 23>
[Chem. 31]
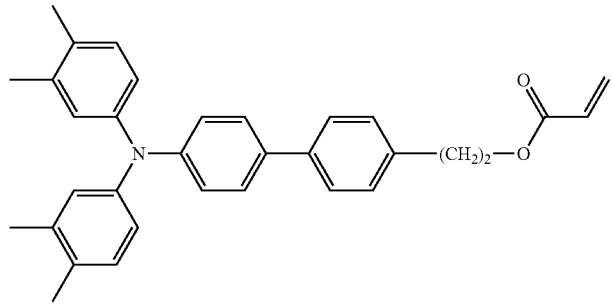
<Exemplary compound 24>
[Chem. 32]
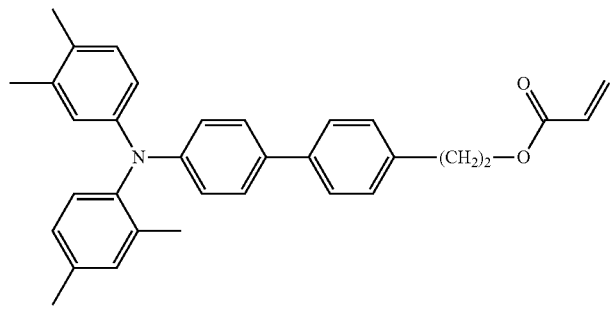
<Exemplary compound 25>
[Chem. 33]
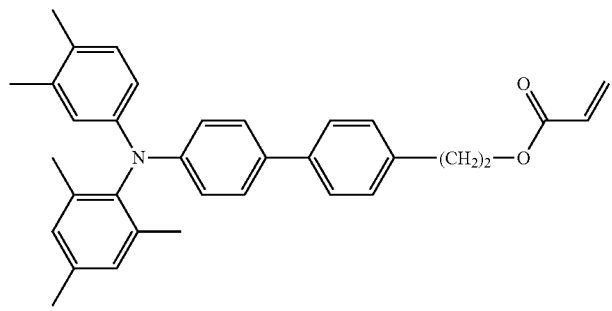
<Exemplary compound 26>
[Chem. 34]
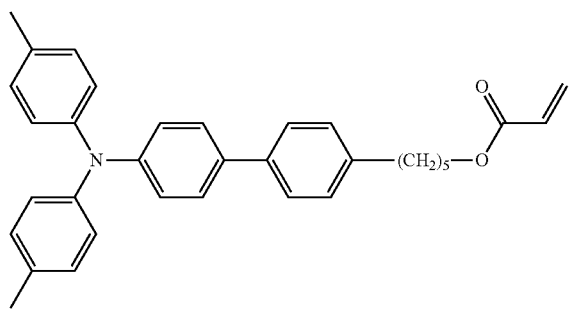

-continued
<Exemplary compound 27>
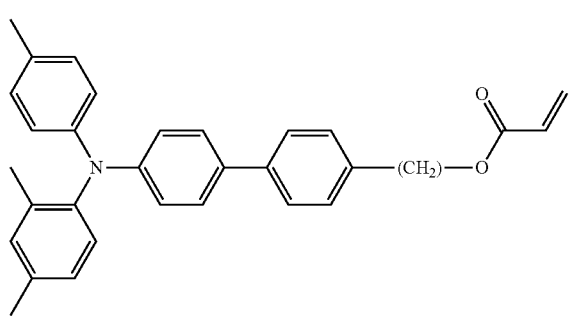
[Chem. 35]
<Exemplary compound 28>
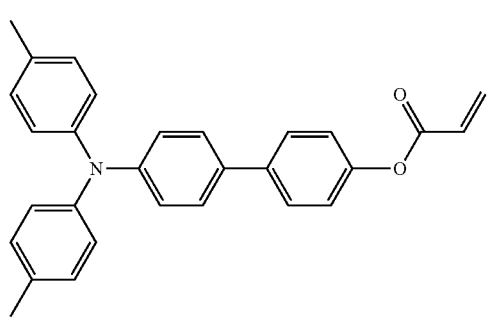
[Chem. 36]
<Exemplary compound 29>
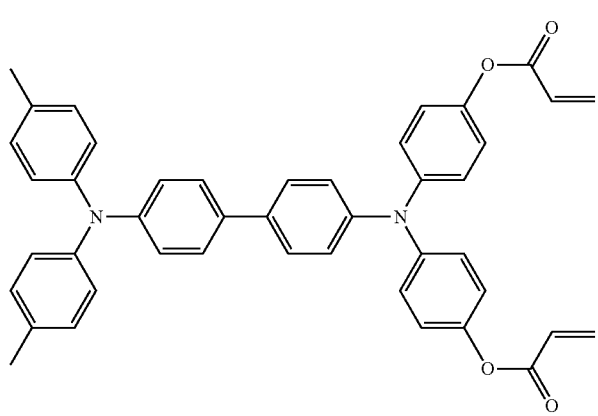
[Chem. 37]
<Exemplary compound 30>
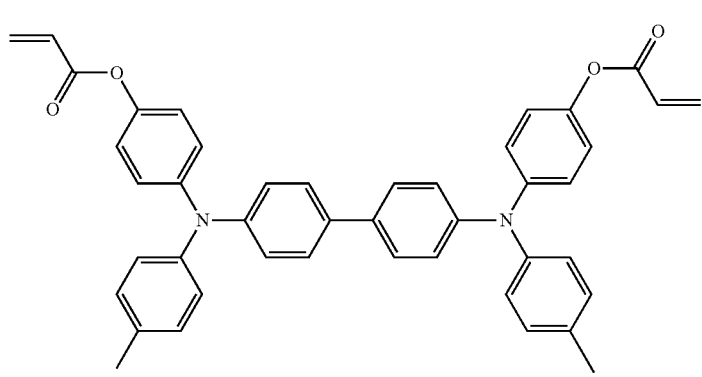
[Chem. 38]

<Exemplary compound 31>
[Chem. 39]
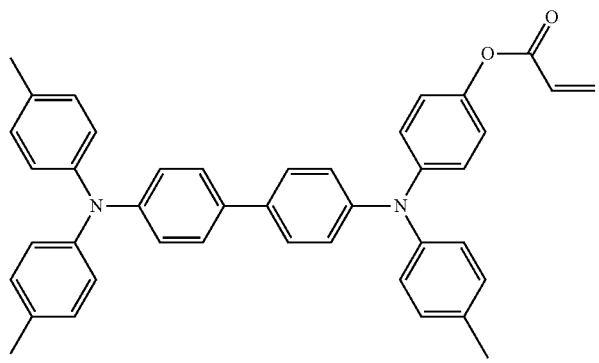
<Exemplary compound 32>
[Chem. 40]
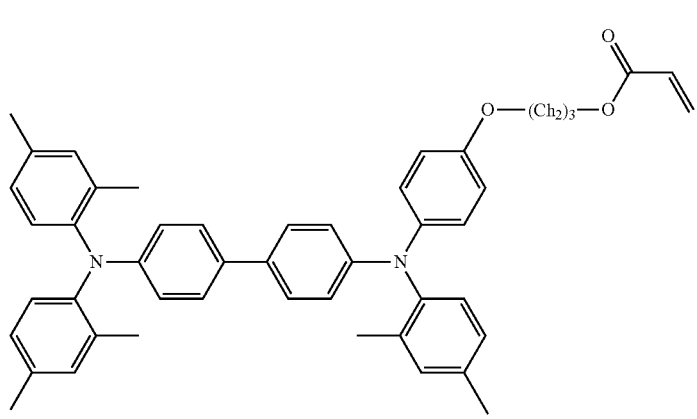
<Exemplary compound 33>
[Chem. 41]
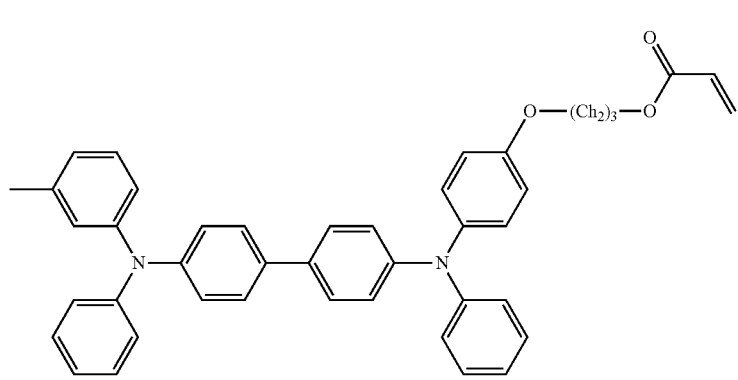

<Exemplary compound 34>
[Chem. 42]
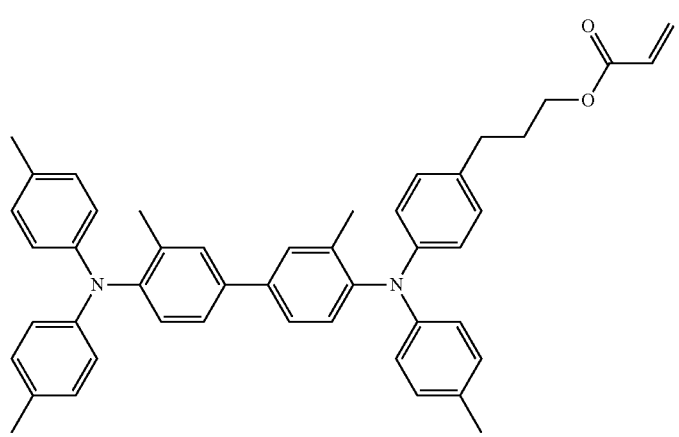
<Exemplary compound 35>
[Chem. 43]
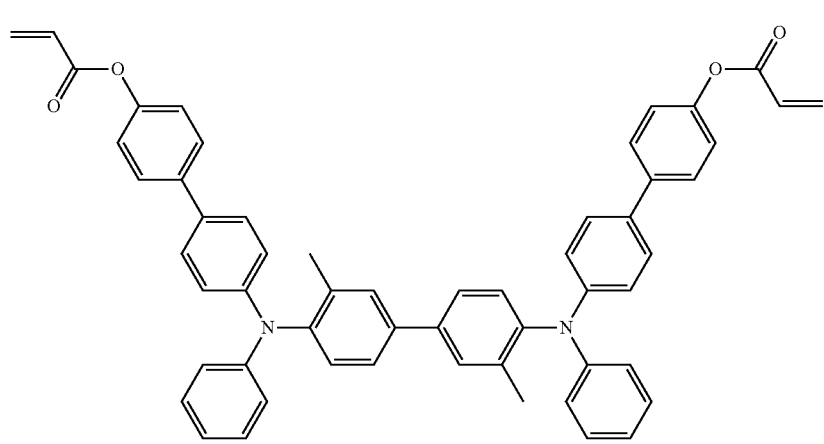
<Exemplary compound 36>
[Chem. 44]
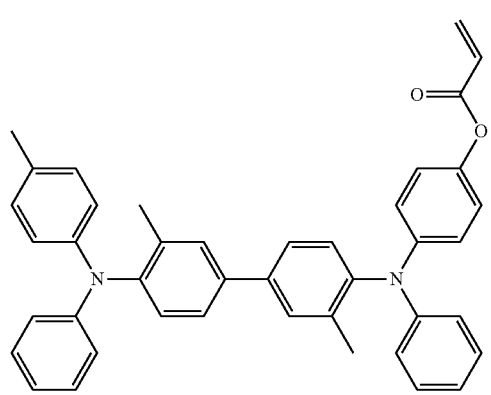

<Exemplary compound 37>

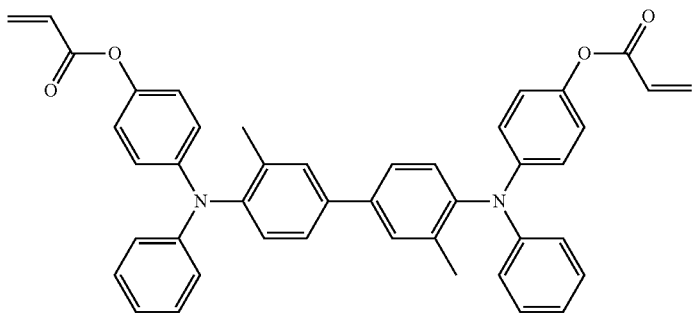

[Chem. 45]

<Exemplary compound 38>

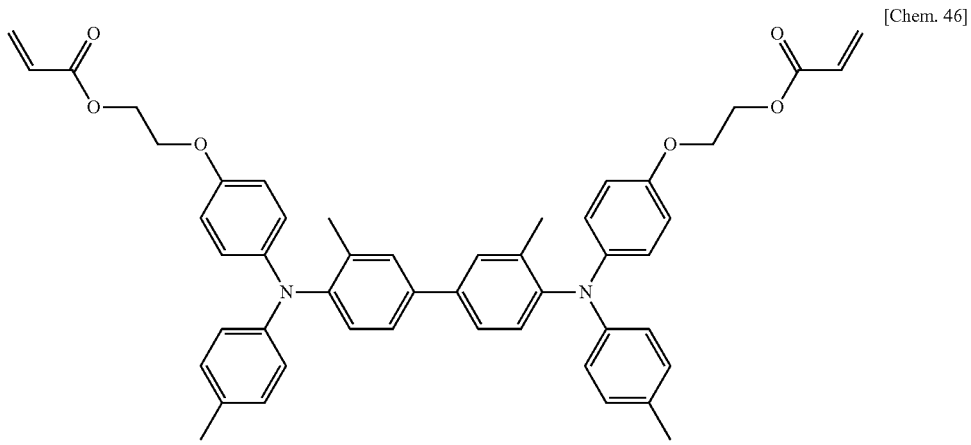

[Chem. 46]

<Exemplary compound 39>

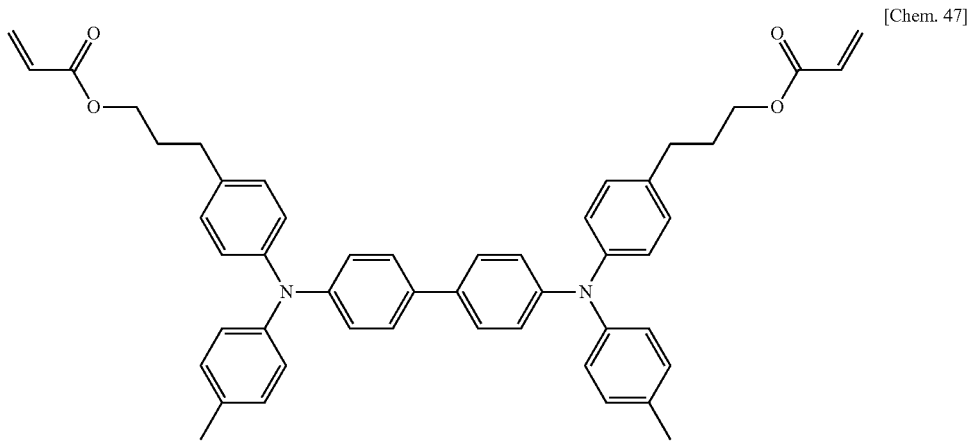

[Chem. 47]

«Another Radical-polymerizable Compound»

The another radical-polymerizable compound refers to compounds including at least one radical-polymerizable functional group but different from the radical-polymerizable compound including a triarylamine backbone. Examples of the another radical-polymerizable compound include monofunctional radical-polymerizable compounds, difunctional radical-polymerizable compounds, trifunctional or higher radical-polymerizable compounds, monomers having functions, and radical-polymerizable oligomer. Among them, difunctional or higher radical-polymerizable compounds are particularly preferable. A radical-polymerizable functional group in the another radical-polymerizable compound is the same as the radical-polymerizable functional group in the radical-polymerizable compound including a triarylamine backbone. Among them, an acryloyloxy group and a methacryloyloxy group are particularly preferable.

Examples of the monofunctional radical-polymerizable compounds include 2-(2-ethoxyethoxy)ethyl acrylate, methoxy polyethylene glycol monoacrylate, methoxy polyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomers. These may be used alone or in combination.

Examples of the difunctional radical-polymerizable compounds include 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, and neopentyl glycol diacrylate. These may be used alone or in combination.

Examples of the trifunctional or higher radical-polymerizable compounds include trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl)isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythri-tolethoxy tetraacrylate, EO-modified phosphate triacrylate, and 2,2,5,5-tetrahydroxymethylcyclopentanone tetraacrylate. These may be used alone or in combination. Note that, in the above description, the term EO-modified denotes ethyleneoxy-modified and the term PO-modified denotes propyleneoxy-modified.

Examples of the functional monomers include those in which a fluorine atom is substituted such as octafluoropentyl acrylate, 2-perfluorooctylethyl acrylate, 2-perfluorooctyl-ethyl methacrylate, and 2-perfluoroisononylethyl acrylate; and vinyl-monomers, acrylates, and methacrylates described in Japanese Examined Patent Publication No. 05-60503 and Japanese Examined Patent Publication No. 06-45770, the vinyl-monomers, the acrylates, and the methacrylates each including a polysiloxane group and from 20 through 70 siloxane repeating units, such as acryloylpolydimethyl-siloxaneethyl, methacryloylpolydimethylsiloxaneethyl, acryloylpolydimethylsilox-anepropyl, acryloylpolydimethylsiloxanebutyl, and diacryloylpolydimethylsilox-anediethyl. These may be used alone or in combination.

Examples of the radical-polymerizable oligomers include epoxyacrylate-based oligomers, urethaneacrylate-based oligomers, and polyesteracrylate-based oligomers.

It is preferable that at least one of the radical-polymerizable compound including a triarylamine backbone and the another radical-polymerizable compound different from the radical-polymerizable compound including a triarylamine backbone include two or more radical-polymerizable functional groups from the viewpoint of formation of a cross-linked product. An amount of the radical-polymerizable compound including a triarylamine backbone is preferably from 10% by mass or more but 100% by mass or less, more preferably 30% by mass or more but 90% by mass or less relative to a total amount of the electrochromic composition. When the amount is 10% by mass or more, a first electrochromic layer is capable of sufficiently exerting an electrochromic function, has good durability to repetitive use with application of voltage, and has good coloring sensitivity. The electrochromic function is capable of being also exerted when the amount is 100% by mass. In this case, coloring sensitivity is the highest per a thickness. In contrast, compatibility with an ionic liquid required for donating and accepting electric charges may become low. Therefore, electric properties are deteriorated due to reduction in durability caused by repetitive use with application of voltage. The amount cannot be sweepingly determined because required electric properties are different depending on a process to be used, but the amount is particularly preferably 30% by mass or more but 90% by mass or less in view of a balance between coloring sensitivity and durability to repetitive use.

«Polymerization Initiator141

The first electrochromic composition preferably includes a polymerization initiator, if necessary, in order to allow a cross-linking reaction between the radical-polymerizable compound including a triarylamine backbone and the another radical-polymerizable compound different from the radical-polymerizable compound including a triarylamine backbone to efficiently progress. Examples of the polymerization initiator include thermal polymerization initiators and photopolymerization initiators. Photopolymerization initiators are preferable from the viewpoint of polymerization efficiency.

The thermal polymerization initiators are not particularly limited and may be appropriately selected depending on the intended purpose. Examples of the thermal polymerization initiators include peroxide-based initiators, such as 2,5-dimethylhexane-2,5-dihydroperoxide, dicumyl peroxide, benzoyl peroxide, t-butylcumyl peroxide, 2,5-dimethyl-2,5-di(peroxybenzoyl)hexyne-3, di-t-butyl peroxide, t-butyl hydroperoxide, cumene hydroperoxide, and lauroyl peroxide; and azo-initiators, such as azobisisobutyl nitrile, azobiscyclohexanecarbonitrile, methyl azobisisobutyrate, azobisisobutylamidine hydrochloride, and 4,4'-azobis-4-cyanovaleric acid. These may be used alone or in combination.

The photopolymerization initiators are not particularly limited and may be appropriately selected depending on the intended purpose. Examples of the photopolymerization initiators include acetophenone-based or ketal-based photopolymerization initiators, such as diethoxyacetophenone, 2,2-dimethoxy-1,2-diphenylethan-1-one, 1-hydroxy-cyclohexyl-phenyl-ketone, 4-(2-hydroxyethoxy)phenyl-(2-hydroxy-2-propyl)ketone, 2-benzyl-2-dimethylamino-1-(4-morpholinophenyl)butanone-1, 2-hydroxy-2-methyl-1-phenylpropan-1-one, 2-methyl-2-morpholino(4-methylthiophenyl)propan-1-one, and 1-phenyl-1,2-propanedione-2-(o-ethoxycarbonyl)oxime; benzoin ether-based photopolymerization initiators, such as benzoin, benzoin methyl ether, benzoin ethyl ether, benzoin isobutyl ether, and benzoin isopropyl ether; benzophenone-based photopolymerization initiators, such as benzophenone, 4-hydroxybenzophenone, methyl o-benzoylbenzoate, 2-benzoylnaphthalene, 4-benzoylbiphenyl, 4-benzoylphenyl ether, acrylated benzophenone, and 1,4-benzoylbenzene; and thioxanthone-based photopolymerization initiators, such as 2-isopropylthioxanthone, 2-chlorothioxanthone, 2,4-dimethylthioxanthone, 2,4-diethylthioxanthone, and 2,4-dichlorothioxanthone.

Other examples of the photopolymerization initiators include ethyl anthraquinone, 2,4,6-trimethylbenzoyldiphenylphosphine oxide, 2,4,6-trimethylbenzoylphenylethoxyphosphine oxide, bis(2,4,6-trimethylbenzoyl)phenylphosphine oxide, bis(2,4-dimethoxybenzoyl)-2,4,4-trimethylpentylphosphine oxide, methylphenyl-glyoxylic ester, 9,10-phenanthrene, acridine-based compounds, triazine-based compounds, and imidazole-based compounds. These may be used alone or in combination. Note that, a compound having a photopolymerization acceleration effect may be used alone or in combination with the photopolymerization initiator. Examples of such a compound include triethanol amine, methyldiethanolamine, ethyl 4-dimethylaminobenzoate, isoamyl 4-dimethylaminobenzoate, ethyl (2-dimethylamino)benzoate, and 4,4'-dimethylaminobenzophenone.

An amount of the polymerization initiator is preferably 0.5 parts by mass or more but 40 parts by mass or less, more preferably 1 part by mass or more but 20 parts by mass or less relative to 100 parts by mass of a total amount of the polymerizable compound.

«Filler141

The filler is not particularly limited and may be appropriately selected depending on the intended purpose. Examples of the filler include organic fillers and inorganic fillers.

Examples of the inorganic fillers include metal powders, such as copper, tin, aluminium, and indium; metal oxides, such as silicon oxide (silica), tin oxide, zinc oxide, titanium oxide, aluminium oxide (alumina), zirconium oxide, iron oxide, antimony oxide, bismuth oxide, calcium oxide, antimony-doped tin oxide (ATO), and tin-doped indium oxide; and metal fluorides, such as tin fluoride, calcium fluoride, and aluminium fluoride. These may be used alone or in combination. Among them, metal oxides are preferable, and silica, alumina, and antimony-doped tin oxide (ATO) are particularly preferable from the viewpoints of transparency, stability, and easiness of surface treatment.

Examples of the organic fillers include resins, such as polyester, polyether, polysulfide, polyolefin, silicone, and polytetrafluoroethylene; low-molecular-weight compounds, such as fatty acids; and pigments, such as phthalocyanine. These may be used alone or in combination. Among them, resins are preferable from the viewpoints of transparency and insolubility. An average primary particle diameter of the fillers is preferably 1 micrometer or less, more preferably 10 nm or more but 1 micrometer or less. When the average primary particle diameter of the fillers is 1 micrometer or less, coarse particles are not present, the resultant film has a good surface state, and excellent surface smoothness is obtained.

An amount of the filler based on a solid content concentration is preferably 0.3 parts by mass or more but 1.5 parts by mass or less, more preferably 0.6 parts by mass or more but 0.9 parts by mass or less relative to 100 parts by mass of a total amount of the radical-polymerizable compound. When the amount is 0.3 parts by mass or more, an effect achievable by adding the filler is sufficiently exerted and good film formability is achieved. When the amount is 1.5 parts by mass or less, the radical-polymerizable compound including a triarylamine backbone is included at an appropriate proportion and thus the resultant electrochromic element is capable of having good electro-chemical properties.

<Other Components>

The other components are not particularly limited and may be appropriately selected depending on the intended purpose. Examples of the other components include solvents, plasticizers, leveling agents, sensitizers, dispersing agents, surfactants, and antioxidants.

The first electrochromic layer is capable of being formed by a method for producing an electrochromic element described below. An average thickness of the first electrochromic layer is preferably 0.1 micrometers or more but 30 micrometers or less, more preferably 0.4 micrometers or more but 10 micrometers or less.

<Second Electrochromic Layer>

In the electrochromic element of the present embodiment, a second electrode includes a compound represented by General Formula (I) below (viologen compound). As used herein, the phrase "a second electrode includes a compound represented by General Formula (I) below" includes an aspect where a second electrochromic layer formed of a second electrochromic composition including a compound represented by General Formula (I) below is laminated onto the second electrode, an aspect where two or more layers of the second electrochromic layers are laminated onto the second electrode, and an aspect where the second electrochromic layer is laminated onto a part of the second electrode.

<General Formula (I)>

[Chem. 48]

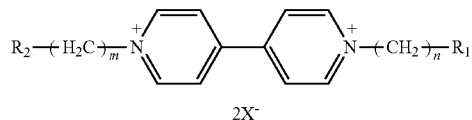

In the General Formula (I), $R_1$ and $R_2$ each denote a hydrogen atom, an aryl group including 14 or less carbon atoms, a heteroaryl group including 14 or less carbon atoms, a branched alkyl group including 10 or less carbon atoms, an alkenyl group including 10 or less carbon atoms, a cycloalkyl group including 10 or less carbon atoms, or a functional group that is capable of binding to a hydroxyl group; n and m each denote 0 or an integer of from 1 through 10; and $X^-$ denotes a charge-neutralizing ion.

In a more preferable aspect, $R_1$ or $R_2$ is a functional group that is capable of binding to a hydroxyl group. This advantageously allows the compound to be adsorbed and immobilized onto a transparent electrode (e.g., ITO). The compound is also capable of being adsorbed and immobilized onto the transparent electrode when bearing particles formed of metal oxides are disposed on the transparent electrode. In a further preferable aspect, both of $R_1$ and $R_2$ are functional groups that are capable of binding to hydroxyl groups.

Examples of the functional group that is capable of binding to a hydroxyl group include a phosphonate group, a phosphate group, a carboxylate group, a sulfonyl group, a silyl group, and a silanol group. Among them, a phosphonate group, a phosphate group, and a carboxylate group are preferable, and a phosphonate group is more preferable from the viewpoints of simplicity of synthesis, adsorptivity to the bearing particles, and stability of the compound.

Examples of the phosphonate group include a methylphosphonate group, an ethylphosphonate group, a propylphosphonate group, a hexylphosphonate group, an octylphosphonate group, a decylphosphonate group, a dodecylphosphonate group, an octadecylphosphonate group, a benzylphosphonate group, a phenylethylphosphonate group, a phenylpropylphosphonate group, and a biphenylphosphonate group. Examples of the phosphate group include a methylphosphate group, an ethylphosphate group, a propylphosphate group, a hexylphosphate group, an octylphosphate group, a de-cylphosphate group, a dodecylphosphate group, an octadecylphosphate group, a ben-zylphosphate group, a phenylethylphosphate group, a phenylpropylphosphate group, and a biphenylphosphate group. Examples of the carboxylate group include a methylcarboxylate group, an ethylcarboxylate group, a propylcarboxylate group, a hexylcar-boxylate group, an octylcarboxylate group, a decylcarboxylate group, a dodecylcar-boxylate group, an octadecylcarboxylate group, a benzylcarboxylate group, a phenylethylcarboxylate group, a phenylpropylcarboxylate group, a biphenylcar-boxylate group, a 4-propylphenylcarboxylate group, and 4-propylbiphenylcarboxylate group.

Examples of the sulfonyl group include a methylsulfonyl group, an ethylsulfonyl group, a propylsulfonyl group, a hexylsulfonyl group, an octylsulfonyl group, a decyl-sulfonyl group, a dodecylsulfonyl group, an octadecylsulfonyl group, a benzylsulfonyl group, a phenylethylsulfonyl group, a phenylpropylsulfonyl group, and a biphenyl-sulfonyl group. Examples of the silyl group include a methylsilyl group, an ethylsilyl group, a propylsilyl group, a hexylsilyl group, an octylsilyl group, a decylsilyl group, a dodecylsilyl group, an octadecylsilyl group, a benzylsilyl group, a phenylethylsilyl group, a phenylpropylsilyl group, and a biphenylsilyl group. Examples of the silanol group include a methylsilanol group, an ethylsilanol group, a propylsilanol group, hexylsilanol group, an octylsilanol group, a decylsilanol group, a dodecylsilanol group, an octadecylsilanol group, a benzylsilanol group, a phenylethylsilanol group, a phenyl-propylsilanol group, and a biphenylsilanol group.

The charge-neutralizing ion $X^-$ denotes a monovalent anion, and is not particularly limited so long as the ion is capable of stably forming a pair with a cationic portion. The $X^-$ is preferably a Br ion ($Br^-$), a Cl ion ($Cl^-$), an I ion ($I^-$), an OTf (triflate) ion, a ($OTf^-$) $ClO_4$ ion ($ClO_4^-$), a $PF_6$ ion ($PF_6^-$), or a $BF_4$ ion ($BF_4^-$).

The viologen compound is preferably a symmetric system including an alkyl chain having a constant length. In this case, m and n in the General Formula (I) preferably 4 or more but 10 or less and m is preferably an integer equal to n. Specific exemplary examples of the viologen compound include those illustrated below, but the viologen compound is not limited thereto.

<Exemplary compound A>

[Chem. 49]

$(HO)_2OP-(CH_2)_8-N^+\text{-pyridyl-pyridyl-}N^+-(CH_2)_8-PO(OH)_2$ · 2Br$^-$

<Exemplary compound B>

[Chem. 50]

$(HO)_2OP-(H_2C)_5-N^+\text{-pyridyl-pyridyl-}N^+-(CH_2)_5-PO(OH)_2$ · 2Br$^-$

<Exemplary compound C>

[Chem. 51]

$(HO)_2OP-(CH_2)_4-N^+\text{-pyridyl-pyridyl-}N^+-(CH_2)_4-PO(OH)_2$ · 2Br$^-$

<Exemplary compound D>

[Chem. 52]

$(HO)_2OP-(CH_2)_3-N^+\text{-pyridyl-pyridyl-}N^+-(CH_2)_3-PO(OH)_2$ · 2Br$^-$

<Exemplary compound E>

[Chem. 53]

$(HO)_2OP-(CH_2)_2-N^+\text{-pyridyl-pyridyl-}N^+-(CH_2)_2-PO(OH)_2$ · 2Br$^-$

<Exemplary compound F>

[Chem. 54]

$(HO)_2OP-(CH_2)_8-N^+\text{-pyridyl-pyridyl-}N^+-(CH_2)_8-$ · 2Br$^-$

<Exemplary compound G>

[Chem. 55]

$(HO)_2OP-(CH_2)_5-N^+\text{-pyridyl-pyridyl-}N^+-(CH_2)_5-$ · 2Br$^-$

<Exemplary compound H>

[Chem. 56]

$HOOC-(CH_2)_5-N^+\text{-pyridyl-pyridyl-}N^+-(CH_2)_8-COOH$ · 2Br$^-$

<Exemplary compound I>

[Chem. 57]

$(HO)_2OP-(H_2C)_5-N^+\text{-pyridyl-pyridyl-}N^+-(CH_2)_5-Ph$ · 2Cl$^-$

<Exemplary compound J>

[Chem. 58]

$(HO)_2OP-(CH_2)_3-N^+\text{-pyridyl-pyridyl-}N^+-(CH_2)_3-furyl$ · 2Cl$^-$

<Exemplary compound K>

[Chem. 59]

$(HO)_2OP-(CH_2)_{10}-N^+\text{-pyridyl-pyridyl-}N^+-(CH_2)_{10}-PO(OH)_2$ · 2Br$^-$ Examples of a method for forming the second electrochromic layer include vacuum vapor deposition, sputtering, and ion plating. Various methods such as spin coating, casting, microgravure coating, gravure coating, bar coating, roll coating, wire bar coating, dip coating, slit coating, capillary coating, spray coating, nozzle coating, and various printing methods (e.g., gravure printing, screen printing, flexographic printing, offset printing, reverse printing, and inkjet printing) may also be used, so long as materials of the second electrochromic layer are capable of being applied to form the second electrochromic layer.

An average thickness of the second electrochromic layer is not particularly limited and may be appropriately selected depending on the intended purpose, but is preferably 0.2 micrometers or more but 5.0 micrometers or less. When the average thickness is less than 0.2 micrometers, coloring density may be less likely to be achieved. When the average thickness is more than 5.0 micrometers, a manufacturing cost is increased and visibility may be likely to be deteriorated due to coloring. The second electrochromic layer is capable of being formed by vacuum film formation, but is preferably formed by coating with particle-dispersed paste from the viewpoint of pro-ductivity.

<First Electrode and Second Electrode>

Materials of the first electrode and the second electrode are not particularly limited and may be appropriately selected depending on the intended purpose, so long as the materials are conductive, transparent materials. Examples of the materials include inorganic materials such as tin-doped indium oxide (hereinafter referred to as "ITO"), fluorine-doped tin oxide (hereinafter referred to as "FTO"), antimony-doped tin oxide (hereinafter referred to as "ATO"), and zinc oxide. Among them, InSnO, GaZnO, SnO, $In_2O_3$, and ZnO are preferable.

Moreover, it is also possible to use an electrode which is prepared by forming transparent carbon nanotubes or a highly-conductive, non-transparent material (e.g., Au, Ag, Pt, and Cu) into a fine network to improve conductivity with maintaining transparency. A thickness of each of the first electrode and the second electrode is adjusted to obtain an electric resistance value required for an oxidation-reduction reaction of an electrochromic layer. When ITO is used as the materials of the first electrode and the second electrode, the thickness of each of the first electrode and the second electrode is, for example, preferably 50 nm or more but 500 nm or less.

Examples of a method for producing each of the first electrode and the second electrode include vacuum vapor deposition, sputtering, and ion plating. The method is not particularly limited, so long as materials of each of the first electrode and the second electrode are capable of being applied to form the first electrode or the second electrode. For example, various methods such as spin coating, casting, microgravure coating, gravure coating, bar coating, roll coating, wire bar coating, dip coating, slit coating, capillary coating, spray coating, nozzle coating, and various printing methods (e.g., gravure printing, screen printing, flexographic printing, offset printing, reverse printing, and inkjet printing) may be used.

<Electrolyte>

The electrolyte is filled between the first electrode and the second electrode. Examples of the electrolyte include inorganic ionic salts (e.g., alkali metal salts and alkaline earth metal salts) and supporting electrolytes (e.g., quaternary ammonium salts, acids, and alkalis). Specific examples include $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$.

An ionic liquid may be used as a material of the electrolyte. In particular, organic ionic liquids are preferably used because the organic ionic liquids have molecular structures which exist as liquids in a wide range of temperatures including room temperature. Examples of cationic components in the molecular structures of the organic ionic liquids include imidazole derivatives such as N,N-dimethylimidazole salts, N,N-methylethylimidazole salts, and N,N-methylpropylimidazole salts; pyridinium derivatives such as N,N-dimethylpyridinium salts and N,N-methylpropylpyridinium salts; and aliphatic quaternary ammonium salts such as trimethylpropyl ammonium salts, trimethylhexyl ammonium salts, and triethylhexyl ammonium salts. Meanwhile, as anionic components, fluorine-including compounds are preferably used in view of stability in the atmosphere. Examples of the anionic components include $BF_4^-$, $CF_3SO_3^-$, $PF_4^-$, and $(CF_3SO_2)_2N^-$.

The material of the electrolyte is preferably an ionic liquid including any combinations of the cationic component with the anionic component. A photopolymerizable monomer, a photopolymerizable oligomer, or a photopolymerizable liquid crystal material may be directly dissolved in the ionic liquid. When solubility is poor, a solution prepared by dissolving the ionic liquid in a small amount of a solvent may be mixed with the photopolymerizable monomer, the photopolymerizable oligomer, or the photopolymerizable liquid crystal material. Examples of the solvent include propylene carbonate, acetonitrile, gamma-butyrolactone, ethylene carbonate, sulfolane, dioxolane, tetrahydrofuran, 2-methyltetrahydrofuran, dimethylsulfoxide, 1,2-dimethoxyethane, 1,2-ethoxymethoxyethane, polyethylene glycol, alcohols, and mixed solvents of the above-listed solvents.

The electrolyte is not necessarily a low-viscous liquid, and is capable of being in various forms such as a gel, a cross-linked polymer, or a liquid crystal dispersion. The electrolyte is advantageously in the form of gel or solid in terms of improvement in strength and reliability of the resultant element. A method for solidifying the electrolyte is preferably to hold the electrolyte and the solvent in a polymer resin because high ion conductivity and high solid strength are capable of being obtained. The polymer resin is preferably a photocurable resin because an electrochromic element is capable of being produced at a lower temperature and in a shorter period compared with methods where a thin film is formed through evaporation of a solvent or thermal polymerization. An average thickness of an electrolyte layer formed of the electrolyte is not particularly limited and may be appropriately selected depending on the intended purpose, but is preferably 100 nm or more but 10 micrometers or less.

<Other Members>

The other members are not particularly limited and may be appropriately selected depending on the intended purpose. Examples of the other members include a support, an insulating porous layer, an anti-deterioration layer, and a protective layer.

—Support—

The support has a function of supporting, for example, the first electrode, the first electrochromic layer, the second electrode, and the second electrochromic layer. Organic materials or inorganic materials well known in the art may be used as the support as they are, so long as the materials are transparent materials that are capable of supporting the above-described layers and the above-described electrodes.

Examples of the support include glass substrates such as non-alkali glass, borosilicate glass, float glass, and soda-line glass; and resin substrates such as polycarbonate resins, acrylic resins, polyethylene, polyvinyl chloride, polyester, epoxy resins, melamine resins, phenolic resins, polyurethane resins, and polyimide resins. A surface of the support may be coated with a transparent insulating layer, a UV-cut layer, or an antireflection layer in order to enhance a water-vapor barrier property, a gas barrier property, ultraviolet resistance, and visibility.

A shape of the support is not particularly limited and may be appropriately selected depending on the intended purpose. The shape may be a rectangle or a circle. A plurality of the supports may be laminated. For example, a support having a configuration where an electrochromic element is sandwiched between two glass substrates is capable of having an enhanced water-vapor barrier property and an enhanced gas barrier property.

—Insulating Porous Layer—

The insulating porous layer has a function of holding the electrolyte and of separating the first electrode and the second electrode from each other so as to elec-trically insulate the first electrode from the second electrode. A material of the insulating porous layer is not particularly limited, so long as the material is porous. Organic materials, inorganic materials, or composites of the organic materials and the inorganic materials, all of which are highly insulating, highly durable, and excellent in film formability, are preferably used.

Examples of a method for forming the insulating porous layer include sintering methods (i.e., methods where polymer particles or inorganic particles are partially fused to each other by adding with, for example, a binder, to create pores between the particles), extraction methods (i.e., methods where a constituent layer is formed of a solvent-soluble organic matter or a solvent-soluble inorganic matter and a solvent-insoluble binder, followed by dissolving the organic matter or the inorganic matter with the solvent to thereby form fine pores), foaming methods where a material is foamed, phase transformation methods where a polymer mixture is phase-separated by using a good solvent and a poor solvent, and radiation methods where pores are formed by radiating various radial rays.

—Anti-Deterioration Layer—

The anti-deterioration layer has a function of preventing corrosion or deterioration of the first electrode and the second electrode caused by an irreversible oxidation-reduction reaction. The function is achieved by taking a balance of electric charges through a reverse chemical reaction to a reaction at an electrochromic layer. Note that, the reverse chemical reaction includes a case where the anti-deterioration layer acts as a capacitor as well as a case where the anti-deterioration layer is oxidized or reduced.

A material of the anti-deterioration layer is not particularly limited and may be appropriately selected depending on the intended purpose, so long as the material plays a role of preventing corrosion of the first electrode and the second electrode caused by an irreversible oxidation-reduction reaction. For example, conductive or semi-conductive metal oxides including antimony tin oxide, nickel oxide, titanium oxide, zinc oxide, tin oxide, or combinations of the above-listed materials may be used. The anti-deterioration layer may be formed of a porous thin film that is porous to such an extent that the electrolyte is not inhibited from being injected. For example, a suitable porous film that allows the electrolyte to permeate and serves as an anti-deterioration layer may be obtained by immobilizing conductive or semiconductive metal oxide particles (e.g., antimony tin oxide, nickel oxide, titanium oxide, zinc oxide, and tin oxide) onto the second electrode with a binder (e.g., an acryl-based binder, an alkyd-based binder, an isocyanate-based binder, an urethane-based binder, an epoxy-based binder, and a phenol-based binder).

—Protective Layer—

The protective layer has functions of protecting the element from external stress or chemicals used in a washing process, preventing leakage of the electrolyte, and preventing migration of substances (e.g., moisture or oxygen in the air) that are unwanted for stable operation of the electrochromic element. An average thickness of the protective layer is not particularly limited and may be appropriately selected depending on the intended purpose, but is preferably 1 micrometer or more but 200 micrometers or less. Examples of a material of the protective layer include UV-ray curable resins and thermosetting resins. Specifically, acryl-based resins, urethane-based resins, or epoxy-based resins may be used.

(Method for Producing Electrochromic Element According to First Embodiment)

A method for producing an electrochromic element according to the first embodiment is a method for producing an electrochromic element that includes a first electrode, a second electrode, and an electrolyte between the first electrode and the second electrode. The method includes a coating step, preferably includes a cross-linking step; and, if necessary, further includes other steps.

<Coating Step>

The coating step is a step of coating the first electrode with a first electrochromic composition including a radical-polymerizable compound including a triarylamine backbone, another radical-polymerizable compound different from the radical-polymerizable compound including a triarylamine backbone, and a filler.

The radical-polymerizable compound including a triarylamine backbone, the another radical-polymerizable compound different from the radical-polymerizable compound including a triarylamine backbone, and the filler may be the same as described for the electrochromic element of the first embodiment.

The first electrode is coated with a coating liquid including the radical-polymerizable compound including a triarylamine backbone and the another radical-polymerizable compound different from the radical-polymerizable compound including a triarylamine backbone. The coating liquid is optionally diluted with a solvent prior to coating. The solvent is not particularly limited and may be appropriately selected depending on the intended purpose. Examples of the solvent include alcohol-based solvents such as methanol, ethanol, propanol, and butanol; ketone-based solvents such as acetone, methyl ethyl ketone, methyl isobutyl ketone, and cyclohexanone; ester-based solvents such as ethyl acetate and butyl acetate; ether-based solvents such as tetrahydrofuran, dioxane, and propyl ether; halogen-based solvents such as dichloromethane, dichloroethane, trichloroethane, and chlorobenzene; aromatic solvents such as benzene, toluene, and xylene; and cellosolve-based solvents such as methylcellosolve, ethylcellosolve, and cellosolve acetate. These may be used alone or in combination. Note that, a dilution ratio with the solvent varies depending on solubility of the first electrochromic composition, a coating method, and a thickness of the first electrochromic layer, but may be appropriately selected. The coating is capable of being performed, for example, by dip coating, spray coating, bead coating, or ring coating.

<Cross-linking Step>

The cross-linking step is a step of cross-linking the first electrochromic composition that has been coated as described above through application of heat or light energy.

After coating the first electrode with the first electrochromic composition, the first electrochromic composition is cured through application of external energy to form a first electrochromic layer. Examples of the external energy include heat, light, and radial rays. A method for applying the heat energy is performed by heating the first electrochromic composition from a side of the coated surface or a side of the support using gas (e.g., air and nitrogen), vapor, various heat media, infrared rays, or electro-magnetic waves.

A temperature for the heating is not particularly limited and may be appropriately selected depending on the intended purpose, but is preferably 60 degrees Celsius or higher but 170 degrees Celsius or lower. UV irradiation light sources having an emission wavelength mainly in an ultraviolet (UV) region, such as high-pressure mercury lamps or metal halide lamps, are available as the light energy. However, visible light sources may be selected so as to be adapted to an absorption wavelength of the radical-polymerizable compound or the photopolymerization initiator. An irradiation dose of UV rays is not particularly limited and may be appropriately selected depending on the intended purpose, but is preferably 5 mW/cm$^2$ or more but 15,000 mW/cm$^2$ or less.

<Other Steps>

Examples of the other steps include a first-electrode forming step, a second-electrode forming step, a second-electrochromic-layer forming step, an insulating-porous-layer forming step, an anti-deterioration-layer forming step, a protective-layer forming step, and a bonding step. The first-electrode forming step, the second-electrode forming step, the second-electrochromic-layer forming step, the insulating-porous-layer forming step, the anti-deterioration-layer forming step, and the protective-layer forming step may be performed using the methods described for configuration of each of the electrodes or the layers. The bonding step may be performed by preparing the first electrode on which, for example, the first electrochromic layer is formed and the second electrode on which, for example, the second electrochromic layer is formed, and bonding to each other via an electrolyte. When the electrolyte is curable with light or heat, the resultant laminate may be cured after bonding.

One exemplary configuration of an electrochromic element according to the first embodiment is illustrated in FIG. 1. This electrochromic element includes, as an electrochromic compound, a polymerized product of an electrochromic composition that includes a radical-polymerizable compound including a triarylamine backbone. As illustrated in FIG. 1, the electrochromic element 10 includes a display electrode (first electrode) 11, an opposing electrode (second electrode) 12 that is opposed to and apart from the display electrode 11, and an electrolyte 13 that is between the both electrodes (the display electrode 11 and the opposing electrode 12).

The display electrode 11 is formed on a first support 14. On a surface of the display electrode 11, a first electrochromic layer 15, which is formed of the electrochromic compound that is a polymerized product of an electrochromic composition that includes a radical-polymerizable compound including a triarylamine backbone, is disposed. In the electrochromic element 10, the first electrochromic layer 15 colors or decolors through an oxidation-reduction reaction in a surface of the display electrode 11. The opposing electrode 12 is formed on a second support 16. The opposing electrode 12 includes a second electrochromic layer 17 including a viologen compound. The second electrochromic layer 17 colors or decolors through an oxidation-reduction reaction in a surface of the opposing electrode 12.

(Electrochromic Element According to Second Embodiment)

The electrochromic element according to the second embodiment of the present invention will now be described. The electrochromic element according to the second embodiment includes a first electrode, a second electrode, and an electrolyte between the first electrode and the second electrode; and, if necessary, further includes other members. The first electrode includes a polymerized product of an electrochromic composition that includes a radical-polymerizable compound including a triarylamine backbone.

The viologen compound represented by the General Formula (I) is capable of binding to or being adsorbed to conductive or semiconductive nanostructure (conductive or semiconductive bearing particle). The conductive or semiconductive nanostructure to which the viologen compound has been bound or adsorbed is referred to as an electrochromic complex. In the present embodiment, the second electrode includes the electrochromic complex. The conductive or semiconductive nanostructure is desirably transparent.

The electrochromic complex develops mainly a blue color and is excellent in an image memory property, that is, colored-image retainability, when used for the electrochromic element.

In the case where at least one selected from $R_1$ and $R_2$ in the General Formula (I) is a functional group capable of binding to a hydroxyl group and the viologen compound includes a phosphonate group, a sulfonate group, a phosphate group, or a carboxyl group as a binding or adsorbing site, the electrochromic compound is easily complexed with the nanostructure to form an electrochromic complex being excellent in colored-image retainability. A plurality of the phosphonate group, the sulfonate group, the phosphate group, or the carboxyl group may be included in the viologen compound. In the case where the viologen compound includes a silyl group or a silanol group, the viologen compound strongly binds to the nanostructure via a siloxane bond. Thus, a stable electrochromic complex is capable of being obtained. The siloxane bond refers to a chemical bond via a silicon atom and an oxygen atom. Moreover, a binding method or a binding form of the viologen compound to the nanostructure is not particularly limited, so long as the electrochromic composition has a structure where the viologen compound binds to the nanostructure via the siloxane bond.

The conductive or semiconductive nanostructure refers to a structure having nanoscaled concavities and convexities such as nanoparticles or a nanoporous structure. For example, a material of the conductive or semiconductive is suitably a metal oxide from the viewpoints of transparency and conductivity. Examples of the metal oxide include those including, as a main component, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, indium oxide, aluminosilicic acid, calcium phosphate, or aluminosilicate. These may be used alone or in combination. Among them, titanium oxide, zinc oxide, tin oxide, zirconium oxide, iron oxide, magnesium oxide, indium oxide, and tungsten oxide are preferable, and titanium oxide is more preferable from the viewpoints of electric properties such as electrocon-ductivity or physical properties such as optical properties. When the metal oxide or a mixture of the metal oxides is used, a coloring or decoloring response speed is excellent.

A shape of the metal oxide is preferably particles having an average primary particle diameter of 30 nm or less. The smaller the average primary particle diameter is, the higher light transmittance and the large surface area per unit volume (referred to as "specific surface area" hereinafter) the metal oxide has. Such a larger specific surface area allows the electrochromic compound to be more efficiently borne on the nanostructure, resulting in multi-color display being excellent in a coloring-decoloring display contrast ratio. The specific surface area of the nanostructure is not particularly limited and may be appropriately selected depending on the intended purpose, but is preferably 100 $m^2/g$ or more.

(Electrochromic Display Element)

One embodiment of an electrochromic display element according to the present invention will now be described. An electrochromic display element according to an embodiment of the present invention includes a first electrode, a second electrode, and an electrolyte between the first electrode and the second electrode. The first electrode includes the radical-polymerizable compound including a triarylamine backbone. The second electrode includes the viologen compound, and, if necessary, further includes other components.

An electrochromic element and an electrochromic display element according to each of the embodiments are operable at a relatively low drive voltage and are excellent in durability to repetitive use and a response speed. Therefore, the electrochromic element and the electrochromic display element are capable of being suitably used for, for example, electrochromic display elements, large-scale display boards (e.g., display boards for stock prices), anti-glare mirrors, dimming elements (e.g., dimming glass), low-voltage-driven elements (e.g., touch panel key switches), optical switches, optical memories, electronic paper, and electronic album.

EXAMPLES

Examples of the present invention will now be described, but the present invention is not limited to the Examples in any way.

Example 1

An example of production of an electrochromic element of Example 1 will now be described.

<Formation of First Electrochromic Layer on First Electrode>

A first electrochromic composition having the below-described composition was prepared in order to form a first electrochromic layer on a first electrode.

<Composition>

Electrochromic compound 1 including monofunctional acrylate (Exemplary compound 1): 50 parts by mass
IRGACURE 184 (available from BASF Japan Ltd.): 5 parts by mass
PEG400 diacrylate including difunctional acrylate (hereinafter, referred to as "PEG400DA," available from Nippon Kayaku Co., Ltd.): 50 parts by mass
Methyl ethyl ketone: 900 parts by mass Then, an ITO glass substrate (40 mm×40 mm, thickness: 0.7 mm, ITO film thickness: about 100 nm) serving as a first electrode was coated with the resultant first electrochromic composition by spin coating. The resultant coated film was irradiated with UV rays at 10 mW for 60 seconds by means of a UV irradiation device (SPOT CURE, available from USHIO INC.) and annealed at 60 degrees Celsius for 10 minutes. Thus, a cross-linked first electrochromic layer having an average thickness of 400 micrometers was formed.

<Formation of Anti-deterioration Layer on Second Electrode>

Then, an ITO glass substrate (40 mm×40 mm, thickness: 0.7 mm, ITO film thickness: about 100 nm) serving as a second electrode was coated with a titanium oxide nanoparticle dispersion liquid (product name: SP210, available from Showa Titanium Co., Ltd., average particle diameter: about 20 nm) serving as an anti-deterioration layer by spin coating. The resultant was annealed at 120 degrees Celsius for 15 minutes. Thus, a nanostructured semiconductive material formed of a titanium oxide particle film having a thickness of 1.0 micrometer was formed.

<Formation of Second Electrochromic Layer on Second Electrode>

A second electrochromic composition having the below-described composition was prepared in order to form a second electrochromic layer on a second electrode.

<Composition>

Electrochromic compound 2 including a functional group that is capable of binding to a hydroxyl group (Exemplary compound A): 20 parts by mass
Tetrafluoropropanol: 980 parts by mass The resultant second electrochromic composition was coated and adsorbed onto the nanostructured semiconductive material formed of a titanium oxide particle film, which has been formed on the second electrode, by spin coating. Then, an unadsorbed compound was washed with methanol. Thus, the second electrochromic layer was formed.

<Filling with Electrolyte Liquid>

An electrolyte liquid having the below-described composition was prepared.

<Composition>

IRGACURE 184 (available from BASF Japan Ltd.): 5 parts by mass
PEG400DA (available from Nippon Kayaku Co., Ltd.): 100 parts by mass
1-Ethyl-3-methylimidazolium tetracyanoborate (available from Merck KGaA): 50 parts by mass Thirty milligrams of the resultant electrolytic liquid was taken into a micropipette, and was dripped onto the ITO glass substrate serving as the second electrode and including the anti-deterioration layer and the second electrochromic layer. The ITO glass substrate serving as the first electrode and including the cross-linked first electrochromic layer was bonded to the resultant so as to leave drawing portions for the electrodes. Thus, a bonded element was produced. The resultant bonded element was irradiated with UV rays (wavelength: 250 nm) at 10 mW for 60 seconds by means of a UV irradiation device (SPOT CURE, available from USHIO INC.). Thus, an electrochromic element of Example 1 was produced.

<Coloring and Decoloring>

Coloring and decoloring of the thus-produced electrochromic element of Example 1 were verified. Specifically, voltage of −2 V was applied between the drawing portion of the first electrode and the drawing portion of the second electrode for 5 seconds. As a result, coloring originated from the Electrochromic Compound 1 in the first electrochromic layer and coloring originated from the Electrochromic Compound 2 in the second electrochromic layer were observed in an overlapped region between the first electrode layer and the second electrode layer. Then, voltage of +2 V was applied between the drawing portion of the first electrode and the drawing portion of the second electrode for 5 seconds. As a result, the overlapped region between the first electrode layer and the second electrode layer was observed to be decolored and turned into transparent.

<Test 1: Repetitive Test>

A coloring and decoloring procedure including applying voltage of −2 V for 5 seconds and applying voltage of +2 V for 5 seconds was repeatedly performed 10,000 times on the electrochromic element of Example 1. In this procedure, the maximum absorption in a visible region (from 400 nm through 800 nm) was determined as λmax (470 nm in Example 1). A change in absorbance was measured by means of USB 4000 and evaluated based on the evaluation criteria described below. Results are presented in Table 1.

(Evaluation Criteria)

A: The absorbance at the λmax was 90% or more relative to the absorbance at the initial state.

B: The absorbance at the λmax was 80% or more but less than 90% relative to the absorbance at the initial state.

C: The absorbance at the λmax was 50% or more but less than 80% relative to the absorbance at the initial state.

D: The absorbance at the λmax was less than 50% relative to the absorbance at the initial state.

<Test 2: Continuous Coloring Test>

Voltage of 1.6 V was applied between the first electrode and the second electrode of the electrochromic element of Example 1. Thus, the electrochromic element was continuously kept in a colored state for 48 hours. An absorbance in a visible region (from 380 nm through 800 nm) was measured by means of USB 4000 before and after applying the voltage. The yellow index (YI) was calculated and a difference in the YI before and after applying the voltage was determined as DYI. The ΔYI was evaluated based on the evaluation criteria described below. Results are presented in Table 1.

(Evaluation Criteria)

A: The ΔYI was less than 1.

B: The ΔYI was 1 or more but less than 5.

C: The ΔYI was 5 or more but less than 10.

D: The ΔYI was 10 or more.

<Test 3: Response Speed>

The electrochromic element of Example 1 was allowed to color by applying voltage of −2 V between the first electrode and the second electrode for 1 second. The electrochromic element in the colored state was irradiated with deuterium and tungsten halogen light (product name: DH-2000, available from Ocean Optics, Inc.). The transmitted light was detected by USB 4000 and measured for a transmission spectrum. In this procedure, a wavelength having the minimum transmittance in a visible region (400 nm or more but 800 nm or less) was determined as λmax. A transmittance at the λmax was evaluated based on the evaluation criteria described below. Results are presented in Table 1.

(Evaluation Criteria)

A: The transmittance at the λmax was less than 10%.

B: The transmittance at the λmax was 10% or more but less than 30%.

C: The transmittance at the λmax was 30% or more but less than 50%.

D: The transmittance at the λmax was 50% or more.

Examples 2 to 39

Electrochromic elements of Examples 2 to 39 were produced in the same manner as in Example 1, except that the Electrochromic compound 1 represented by the Exemplary compound 1 was changed to the Electrochromic compound 1 represented by any of the Exemplary compounds 2 to 39 as presented in Table 1. The electro-chromic elements of Examples 2 to 39 were evaluated in the same manner as in Examples 1 by the Tests 1, 2, and 3. Results are presented in Table 1.

Examples 40 to 49

Electrochromic elements of Examples 40 to 49 were produced in the same manner as in Example 39, except that the Electrochromic compound 2 represented by the Exemplary compound A was changed to the Electrochromic compound 2 represented by any of the Exemplary compounds B to K as presented in Table 1. The electro-chromic elements of Examples 40 to 49 were evaluated in the same manner as in Examples 1 by the Tests 1, 2, and 3. Results are presented in Table 1.

Comparative Example 1

An electrochromic element of Comparative Example 1 was produced in the same manner as in Example 39, except that the Electrochromic compound 2 represented by the Exemplary compound A was not used. The electrochromic element of Comparative Example 1 was evaluated in the same manner as in Examples 1 by the Tests 1, 2, and 3. Results are presented in Table 1.

Comparative Example 2

An electrochromic element of Comparative Example 2 was produced in the same manner as in Example 39, except that the Electrochromic compound 2 represented by the Exemplary compound A was changed to Comparative compound 1 represented by the structural formula below. The electrochromic element of Comparative Example 2 was evaluated in the same manner as in Examples 1 by the Tests 1, 2, and 3. Results are presented in Table 1.

<Comparative Compound 1>

[Chem. 60]

$(HO)_2OP-(CH_2)_8-\overset{+}{N}\diagdown\diagup\diagdown\diagup\overset{+}{N}-(CH_2)_8-PO(OH)_2$ $2Br^-$ Comparative Example 3

An electrochromic element of Comparative Example 3 was produced in the same manner as in Example 39, except that the Electrochromic compound 2 represented by the Exemplary compound A was changed to Comparative compound 2 represented by the structural formula below. The electrochromic element of Comparative Example 3 was evaluated in the same manner as in Examples 1 by the Tests 1, 2, and 3. Results are presented in Table 1.

<Comparative Compound 2>

[Chem. 61]

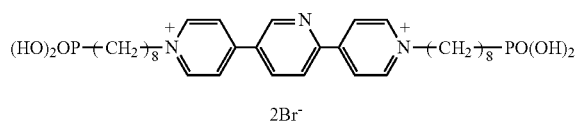

Comparative Example 4

An electrochromic element of Comparative Example 4 was produced in the same manner as in Example 39, except that the Electrochromic compound 2 represented by the Exemplary compound A was changed to Comparative compound 3 represented by the structural formula below. The electrochromic element of Comparative Example 4 was evaluated in the same manner as in Examples 1 by the Tests 1, 2, and 3. Results are presented in Table 1.

<Comparative Compound 3>

[Chem. 62]

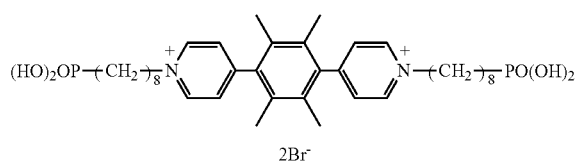

Comparative Example 5

An electrochromic element of Comparative Example 5 was produced in the same manner as in Example 39, except that the Electrochromic compound 2 represented by the Exemplary compound A was changed to Comparative compound 4 represented by the structural formula below. The electrochromic element of Comparative Example 5 was evaluated in the same manner as in Examples 1 by the Tests 1, 2, and 3. Results are presented in Table 1.

<Comparative Compound 4>

[Chem. 63]

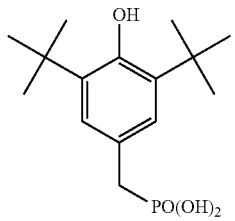

Comparative Example 6

An electrochromic display element of Comparative Example 6 was produced in the same manner as in Example 1, except that titanium oxide was disposed on the first electrode and the first electrode was coated with a 2% by mass solution of Comparative compound 5 represented by the structural formula below in dimethyl formamide instead of the Electrochromic compound 1 represented by the Exemplary compound 1. The electrochromic display element of Comparative Example 6 was evaluated in the same manner as in Examples 1 by the Tests 1, 2, and 3. Results are presented in Table 1.

<Comparative Compound 5>

[Chem. 64]

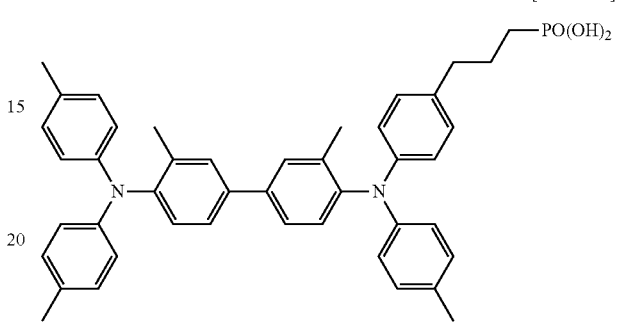

Comparative Example 7

An electrochromic display element of Comparative Example 7 was produced in the same manner as in Example 1, except that titanium oxide was disposed on the first electrode and the first electrode was coated with a 2% by mass solution of Comparative compound 6 represented by the structural formula below (described in Japanese Patent No. 5040218) in dimethyl formamide instead of the Electrochromic compound 1 represented by the Exemplary compound 1. The electrochromic display element of Comparative Example 7 was evaluated in the same manner as in Examples 1 by the Tests 1, 2, and 3. Results are presented in Table 1.

<Comparative Compound 6>

[Chem. 65]

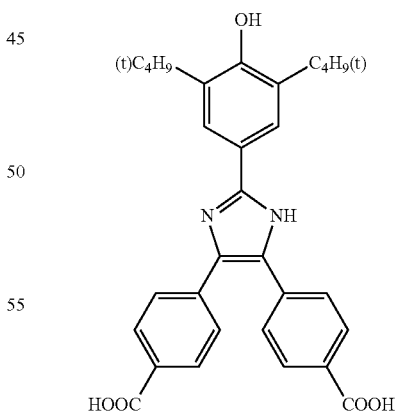

Comparative Example 8

An electrochromic display element of Comparative Example 8 was produced in the same manner as in Example 1, except that titanium oxide was disposed on the first electrode and the first electrode was coated with a 2% by mass solution of Comparative compound 7 represented by the structural formula below (described in Japanese Unexamined Patent Application Publication No. 2016-045464) in methanol instead of the Electrochromic compound 1 represented by the Exemplary compound 1. The electrochromic display element of Comparative Example 8 was evaluated in the same manner as in Examples 1 by the Tests 1, 2, and 3. Results are presented in Table 1.

<Comparative Compound 7>

[Chem. 66]

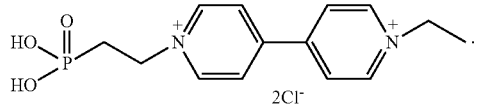

Comparative Example 9

An electrochromic display element of Comparative Example 9 was produced in the same manner as in Example 1, except that titanium oxide was disposed on the first electrode and the first electrode was coated with a 2% by mass solution of Comparative compound 8 represented by the structural formula below (described in Japanese Unexamined Patent Application Publication No. 2016-045464) in methanol instead of the Electrochromic compound 1 represented by the Exemplary compound 1. The electrochromic display element of Comparative Example 9 was evaluated in the same manner as in Examples 1 by the Tests 1, 2, and 3. Results are presented in Table 1.

<Comparative Compound 8>

[Chem. 67]

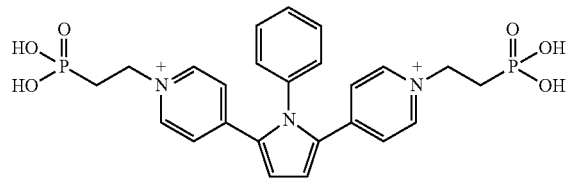

TABLE 1

| Example | Electrochromic compound 1 | Number of radical-polymerizable functional group | Electrochromic compound 2 | Test 1 | Test 2 | Test 3 |
| --- | --- | --- | --- | --- | --- | --- |
| Ex. 1 | Exemplary compound 1 | 1 | Exemplary compound A | A | B | A |
| Ex. 2 | Exemplary compound 2 | 1 | Exemplary compound A | A | B | A |
| Ex. 3 | Exemplary compound 3 | 1 | Exemplary compound A | B | C | A |
| Ex. 4 | Exemplary compound 4 | 1 | Exemplary compound A | B | C | A |
| Ex. 5 | Exemplary compound 5 | 1 | Exemplary compound A | A | B | A |
| Ex. 6 | Exemplary compound 6 | 1 | Exemplary compound A | A | B | A |
| Ex. 7 | Exemplary compound 7 | 1 | Exemplary compound A | A | B | A |
| Ex. 8 | Exemplary compound 8 | 2 | Exemplary compound A | B | B | A |
| Ex. 9 | Exemplary compound 9 | 1 | Exemplary compound A | A | C | A |
| Ex. 10 | Exemplary compound 10 | 1 | Exemplary compound A | A | C | A |
| Ex. 11 | Exemplary compound 11 | 2 | Exemplary compound A | A | C | A |
| Ex. 12 | Exemplary compound 12 | 1 | Exemplary compound A | A | C | A |
| Ex. 13 | Exemplary compound 13 | 1 | Exemplary compound A | B | C | A |
| Ex. 14 | Exemplary compound 14 | 1 | Exemplary compound A | A | C | A |
| Ex. 15 | Exemplary compound 15 | 1 | Exemplary compound A | A | C | A |
| Ex. 16 | Exemplary compound 16 | 1 | Exemplary compound A | A | C | A |
| Ex. 17 | Exemplary compound 17 | 1 | Exemplary compound A | A | C | A |
| Ex. 18 | Exemplary compound 18 | 1 | Exemplary compound A | B | C | A |
| Ex. 19 | Exemplary compound 19 | 1 | Exemplary compound A | B | C | A |
| Ex. 20 | Exemplary compound 20 | 1 | Exemplary compound A | A | C | A |
| Ex. 21 | Exemplary compound 21 | 1 | Exemplary compound A | A | C | A |
| Ex. 22 | Exemplary compound 22 | 1 | Exemplary compound A | A | C | A |
| Ex. 23 | Exemplary compound 23 | 1 | Exemplary compound A | A | C | A |
| Ex. 24 | Exemplary compound 24 | 1 | Exemplary compound A | A | C | A |
| Ex. 25 | Exemplary compound 25 | 1 | Exemplary compound A | A | C | A |
| Ex. 26 | Exemplary compound 26 | 1 | Exemplary compound A | A | C | A |
| Ex. 27 | Exemplary compound 27 | 1 | Exemplary compound A | A | C | A |
| Ex. 28 | Exemplary compound 28 | 1 | Exemplary compound A | A | C | A |
| Ex. 29 | Exemplary compound 29 | 2 | Exemplary compound A | A | B | A |
| Ex. 30 | Exemplary compound 30 | 2 | Exemplary compound A | A | B | A |
| Ex. 31 | Exemplary compound 31 | 1 | Exemplary compound A | A | B | A |
| Ex. 32 | Exemplary compound 32 | 1 | Exemplary compound A | A | B | A |
| Ex. 33 | Exemplary compound 33 | 1 | Exemplary compound A | B | B | A |
| Ex. 34 | Exemplary compound 34 | 1 | Exemplary compound A | A | C | A |
| Ex. 35 | Exemplary compound 35 | 2 | Exemplary compound A | B | C | A |
| Ex. 36 | Exemplary compound 36 | 1 | Exemplary compound A | B | C | A |
| Ex. 37 | Exemplary compound 37 | 2 | Exemplary compound A | B | C | A |
| Ex. 38 | Exemplary compound 38 | 2 | Exemplary compound A | A | C | A |
| Ex. 39 | Exemplary compound 39 | 2 | Exemplary compound A | A | B | A |
| Ex. 40 | Exemplary compound 39 | 2 | Exemplary compound B | A | A | A |
| Ex. 41 | Exemplary compound 39 | 2 | Exemplary compound C | A | B | A |
| Ex. 42 | Exemplary compound 39 | 2 | Exemplary compound D | A | C | A |
| Ex. 43 | Exemplary compound 39 | 2 | Exemplary compound E | A | C | A |
| Ex. 44 | Exemplary compound 39 | 2 | Exemplary compound F | A | B | A |

TABLE 1-continued

| Example | Electrochromic compound 1 | Number of radical-polymerizable functional group | Electrochromic compound 2 | Test 1 | Test 2 | Test 3 |
|---|---|---|---|---|---|---|
| Ex. 45 | Exemplary compound 39 | 2 | Exemplary compound G | A | A | A |
| Ex. 46 | Exemplary compound 39 | 2 | Exemplary compound H | A | B | A |
| Ex. 47 | Exemplary compound 39 | 2 | Exemplary compound I | A | C | A |
| Ex. 48 | Exemplary compound 39 | 2 | Exemplary compound J | A | C | A |
| Ex. 49 | Exemplary compound 39 | 2 | Exemplary compound K | A | B | A |
| Comp. Ex. 1 | Exemplary compound 39 | 2 | None | C | D | D |
| Comp. Ex. 2 | Exemplary compound 39 | 2 | Comparative compound 1 | A | C | C |
| Comp. Ex. 3 | Exemplary compound 39 | 2 | Comparative compound 2 | A | D | B |
| Comp. Ex. 4 | Exemplary compound 39 | 2 | Comparative compound 3 | B | C | D |
| Comp. Ex. 5 | Exemplary compound 39 | 2 | Comparative compound 4 | B | C | D |
| Comp. Ex. 6 | Comparative compound 5 | 0 | Exemplary compound A | D | D | B |
| Comp. Ex. 7 | Comparative compound 6 | 0 | Exemplary compound A | D | D | B |
| Comp. Ex. 8 | Exemplary compound 39 | 2 | Comparative compound 7 | B | C | B |
| Comp. Ex. 9 | Exemplary compound 39 | 2 | Comparative compound 8 | B | D | C |

It can be seen from the results in Table 1 that the electrochromic elements of Comparative Examples 1 to 9 were not satisfactory in all of durability to repetitive use, a continuous driving property (less yellowing), and responsivity. On the contrary, it can be seen that the electrochromic elements of Examples 1 to 49 had all of good durability to repetitive use, good responsivity, and a good continuous driving property (less yellowing).

Aspects of the present invention are, for example, as follows.

<1> An electrochromic element including:
a first electrode;
a second electrode that is opposed to and apart from the first electrode; and
an electrolyte that is between the first electrode and the second electrode,
wherein the first electrode includes a polymerized product of an electrochromic composition that includes a radical-polymerizable compound including a triarylamine backbone and a radical-polymerizable functional group, and
wherein the second electrode includes a compound represented by General Formula (I) below:

<General Formula (I)>

[Chem. 68]

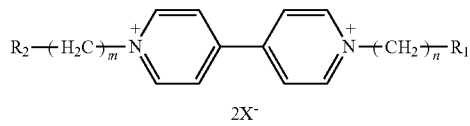

where $R_1$ and $R_2$ each denote a hydrogen atom, an aryl group including 14 or less carbon atoms, a heteroaryl group including 14 or less carbon atoms, a branched alkyl group including 10 or less carbon atoms, an alkenyl group including 10 or less carbon atoms, a cycloalkyl group including 10 or less carbon atoms, or a functional group that is capable of binding to a hydroxyl group; n and m each denote 0 or an integer of from 1 through 10; and $X^-$ denotes a charge-neutralizing ion.

<2> The electrochromic element according to <1>,
wherein the first electrode includes a cross-linked product of a first electrochromic composition that includes the radical-polymerizable compound including a triarylamine backbone and another radical-polymerizable compound including a radical-polymerizable functional group different from the radical-polymerizable compound including a triarylamine backbone.

<3> The electrochromic element according to <2>,
wherein the radical-polymerizable compound including a triarylamine backbone or the another radical-polymerizable compound different from the radical-polymerizable compound including a triarylamine backbone includes two or more radical-polymerizable functional groups.

<4> The electrochromic element according to <2> or <3>,
wherein the radical-polymerizable functional group included in the another radical-polymerizable compound includes is at least one of an acryloyloxy group and a methacryloyloxy group.

<5> The electrochromic element according to any one of <1> to <4>,
wherein the radical-polymerizable functional group included in the radical-polymerizable compound includes is at least one of an acryloyloxy group and a methacryloyloxy group.

<6> The electrochromic element according to any one of <1> to <5>,
wherein the radical-polymerizable compound including a triarylamine backbone is represented by General Formula 1 below:

An–Bm     <General Formula 1> where m is 0 when n=2, and m is 0 or 1 when n=1; at least one of A and B is a radical-polymerizable functional group; the A has a structure represented by General Formula 2 below and is bound to the B at any position of $R_1$ to $R_{15}$; and the B has a structure represented by General Formula 3 below and is bound to the A at any position of $R_{16}$ to $R_{21}$;

<General Formula 2>

[Chem. 69]

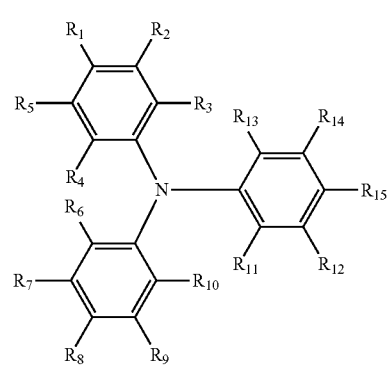

-continued

<General Formula 3>

[Chem. 70]

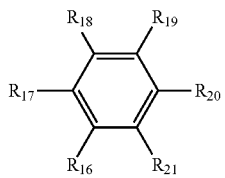

where, in the General Formulae 2 and 3, $R_1$ to $R_{21}$, which may be identical to or different from each other, are all monovalent organic groups, and at least one of the monovalent organic groups is a radical-polymerizable functional group.

<7> The electrochromic element according to any one of <1> to <6>,
wherein the compound included in the second electrode is the compound represented by the General Formula (I) where $R_1$ or $R_2$ is a functional group that is capable of binding to a hydroxyl group, the compound being bound to conductive or semiconductive bearing particles.

<8> The electrochromic element according to any one of <1> to <7>,
wherein the compound included in the second electrode is the compound represented by the General Formula (I) where $R_1$ and $R_2$ each are a functional group that is capable of binding to a hydroxyl group, the compound being bound to conductive or semiconductive bearing particles.

<9> The electrochromic element according to any one of <1> to <8>,
wherein the functional group that is capable of binding to a hydroxyl group is a phosphonate group, a phosphate group, a carboxylate group, a sulfonyl group, a silyl group, or a silanol group.

<10> The electrochromic element according to any one of <1> to <9>,
wherein both of m and n in the General Formula (I) are 4 or more but 10 or less.

<11> The electrochromic element according to any one of <1> to <10>,
wherein, in the General Formula (I), m is an integer equal to n.

REFERENCE SIGNS LIST

10 electrochromic element
11 display electrode (first electrode)
12 opposing electrode (second electrode)
13 electrolyte

The invention claimed is:
1. An electrochromic element comprising:
a first electrode;
a second electrode that is opposed to and apart from the first electrode; and
an electrolyte that is between the first electrode and the second electrode,
wherein the first electrode comprises a polymerized product of an electrochromic composition comprising a radical-polymerizable compound comprising a triarylamine backbone and a radical-polymerizable functional group, and wherein the second electrode comprises a compound represented by the following Formula below:

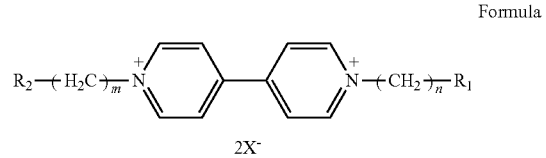

Formula wherein $R_1$ and $R_2$ each denote a hydrogen atom, an aryl group including 14 or less carbon atoms, a heteroaryl group including 14 or less carbon atoms, a branched alkyl group including 10 or less carbon atoms, an alkenyl group including 10 or less carbon atoms, a cycloalkyl group including 10 or less carbon atoms, or a functional group that is capable of binding to a hydroxyl group; n and m each denote 0 or an integer of from 1 through 10; and $X^-$ denotes a charge-neutralizing ion.

2. The electrochromic element according to claim 1,
wherein the first electrode comprises a cross-linked product of a first electrochromic composition comprising the radical-polymerizable compound comprising a triarylamine backbone and another radical-polymerizable compound comprising a radical-polymerizable functional group different from the radical-polymerizable compound comprising a triarylamine backbone.

3. The electrochromic element according to claim 2,
wherein the radical-polymerizable compound comprising a triarylamine backbone or the another radical-polymerizable compound different from the radical-polymerizable compound comprising a triarylamine backbone comprises two or more radical-polymerizable functional groups.

4. The electrochromic element according to claim 2,
wherein the radical-polymerizable functional group included in the another radical-polymerizable compound comprises at least one of an acryloyloxy group and a methacryloyloxy group.

5. The electrochromic element according to claim 1,
wherein the radical-polymerizable functional group included in the radical-polymerizable compound comprises at least one of an acryloyloxy group and a methacryloyloxy group.

6. The electrochromic element according to claim 1,
wherein the radical-polymerizable compound comprising a triarylamine backbone is represented by General Formula 1 below:

An–Bm        <General Formula 1> wherein m is 0 when n =2, and m is 0 or 1 when n =1; at least one of A and B is a radical-polymerizable functional group; the A has a structure represented by General Formula 2 below and is bound to the B at any position of $R_1$ to $R_{15}$; and the B has a structure represented by General Formula 3 below and is bound to the A at any position of $R_{16}$ to $R_{21}$ <General Formula 2>

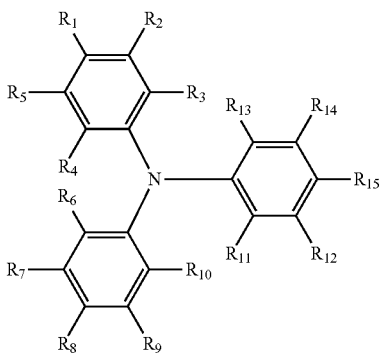

<General Formula 3>

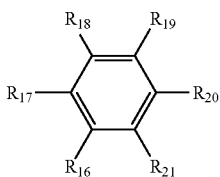

wherein, in the General Formulae 2 and 3, $R_1$ to $R_{21}$, which may be identical to or different from each other, are all monovalent organic groups, and at least one of the monovalent organic groups is a radical-polymerizable functional group.

7. The electrochromic element according to claim 1, wherein the compound included in the second electrode is the compound represented by the Formula wherein $R_1$ or $R_2$ is a functional group that is capable of binding to a hydroxyl group, the compound being bound to conductive or semi-conductive bearing particles.

8. The electrochromic element according to claim 1, wherein the compound included in the second electrode is the compound represented by the Formula wherein $R_1$ and $R_2$ each are a functional group that is capable of binding to a hydroxyl group, the compound being bound to conductive or semiconductive bearing particles.

9. The electrochromic element according to claim 1, wherein the functional group that is capable of binding to a hydroxyl group is a phosphonate group, a phosphate group, a carboxylate group, a sulfonyl group, a silyl group, or a silanol group.

10. The electrochromic element according to claim 1, wherein both of m and n in the Formula are 4 or more but 10 or less.

11. The electrochromic element according to claim 1, wherein, in the Formula, m is an integer equal to n.

* * * * *